(12) United States Patent
Harden et al.

(10) Patent No.: US 10,888,807 B2
(45) Date of Patent: Jan. 12, 2021

(54) DISC FILTER PRE-SCREEN DUAL MEDIA DISC FILTER

(71) Applicant: Evoqua Water Technologies LLC, Pittsburgh, PA (US)

(72) Inventors: Patrick Harden, Thomasville, GA (US); Harry Bryant, Thomasville, GA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 17 days.

(21) Appl. No.: 16/320,011

(22) PCT Filed: Aug. 11, 2017

(86) PCT No.: PCT/US2017/046496
§ 371 (c)(1),
(2) Date: Jan. 23, 2019

(87) PCT Pub. No.: WO2018/031884
PCT Pub. Date: Feb. 15, 2018

(65) Prior Publication Data
US 2019/0224597 A1 Jul. 25, 2019

Related U.S. Application Data

(60) Provisional application No. 62/374,097, filed on Aug. 12, 2016.

(51) Int. Cl.
*B01D 36/02* (2006.01)
*B01D 33/23* (2006.01)
(Continued)

(52) U.S. Cl.
CPC ............ *B01D 36/02* (2013.01); *B01D 33/073* (2013.01); *B01D 33/23* (2013.01); *B01D 33/39* (2013.01);
(Continued)

(58) Field of Classification Search
None
See application file for complete search history.

(56) References Cited

U.S. PATENT DOCUMENTS 1,649,220 A * 11/1927 Goodloe ............... B01D 46/26
55/290
1,685,118 A 9/1928 Campbell
(Continued)

FOREIGN PATENT DOCUMENTS

CA 2023302 A1 2/1991
CA 2070341 A1 12/1992
(Continued)

OTHER PUBLICATIONS

Algas Fluid Technology Systems AS, Environmental Protection Made Profitable, Feb. 3, 2004, 4 pages, Moss Norway.
(Continued)

*Primary Examiner* — Robert J Popovics

(57) ABSTRACT

According to various aspects and embodiments, a system and method for two-stage filtration is provided. The system includes an inlet fluidly connectable with wastewater, a first stage filter assembly that is fluidly connectable with the inlet and has a rotary drum with a filter surface configured for radially inward fluid flow, a second stage filter assembly that is fluidly connectable with the first stage filter and has a plurality of filter discs configured for radially outward fluid flow, and an outlet fluidly connectable with filtrate generated by the second stage disc filter assembly.

12 Claims, 30 Drawing Sheets

(51) Int. Cl.
  *B01D 33/50* (2006.01)
  *B01D 33/073* (2006.01)
  *B01D 33/46* (2006.01)
  *C02F 1/00* (2006.01)
  *B01D 33/39* (2006.01)
  *B01D 33/41* (2006.01)
  *B01D 33/80* (2006.01)
  *B01D 36/04* (2006.01)

(52) U.S. Cl.
  CPC ........... *B01D 33/41* (2013.01); *B01D 33/466* (2013.01); *B01D 33/50* (2013.01); *B01D 33/807* (2013.01); *B01D 36/04* (2013.01); *C02F 1/004* (2013.01); *B01D 2201/184* (2013.01); *C02F 2209/42* (2013.01); *C02F 2301/08* (2013.01); *C02F 2303/16* (2013.01)

(56) References Cited

U.S. PATENT DOCUMENTS

| | | | |
|---|---|---|---|
| 1,712,258 A | 5/1929 | Compain | |
| 1,804,934 A | 5/1931 | Hoyt et al. | |
| 1,826,485 A | 10/1931 | Thorne | |
| 1,833,315 A | 11/1931 | Burhans | |
| 2,022,069 A | 11/1935 | Bryan | |
| 2,076,104 A | 4/1937 | Vinton | |
| 2,092,252 A * | 9/1937 | Hillier | B01D 33/21 210/402 |
| 2,395,499 A * | 2/1946 | Letts | B01D 33/466 210/393 |
| 2,464,223 A | 3/1949 | Genter | |
| 2,894,632 A * | 7/1959 | Myers | B01D 33/23 210/331 |
| 2,899,068 A * | 8/1959 | King | B01D 33/466 210/402 |
| 2,964,194 A | 12/1960 | Oliver et al. | |
| 3,163,601 A * | 12/1964 | Wennberg | B01D 33/21 210/196 |
| 3,193,105 A | 7/1965 | Putnam et al. | |
| 3,221,887 A | 12/1965 | Schade | |
| 3,270,888 A * | 9/1966 | Anderson | B01D 33/23 210/327 |
| 3,331,512 A | 7/1967 | Vore | |
| 3,338,416 A * | 8/1967 | Barry | B01D 35/28 210/297 |
| 3,347,379 A * | 10/1967 | Miller | B01D 33/06 210/127 |
| 3,363,770 A | 1/1968 | Glos, II | |
| 3,369,688 A | 2/1968 | Glos, II | |
| 3,410,410 A * | 11/1968 | Hofmann | B01D 33/048 210/359 |
| 3,438,505 A | 4/1969 | Luthi | |
| 3,471,026 A | 10/1969 | Riker et al. | |
| 3,485,376 A | 12/1969 | Peterson et al. | |
| 3,610,419 A | 10/1971 | Vallee et al. | |
| 3,643,803 A | 2/1972 | Glos, II | |
| 3,692,181 A | 9/1972 | Davis | |
| 3,698,556 A * | 10/1972 | Emmett, Jr. | B01D 33/64 210/178 |
| 3,776,386 A * | 12/1973 | Richter | B01D 33/06 210/398 |
| 3,945,924 A * | 3/1976 | Peterson | B01D 33/048 210/384 |
| 3,948,779 A | 4/1976 | Jackson | |
| 4,032,442 A * | 6/1977 | Peterson | B01D 46/26 210/780 |
| 4,056,473 A * | 11/1977 | Nilsson | D21C 9/18 210/331 |
| 4,075,103 A * | 2/1978 | Kane | B01D 33/803 210/331 |
| 4,090,965 A | 5/1978 | Fuchs | |
| 4,136,028 A * | 1/1979 | Toivonen | B01D 33/463 210/780 |
| 4,139,472 A | 2/1979 | Simonson | |
| 4,162,982 A | 7/1979 | Chesner | |
| 4,255,264 A * | 3/1981 | Madsen | B01D 33/09 210/404 |
| 4,256,580 A | 3/1981 | Rimmele | |
| 4,268,385 A | 5/1981 | Yoshikawa | |
| 4,330,405 A | 5/1982 | Davis et al. | |
| 4,330,408 A * | 5/1982 | McClure | C02F 3/082 210/619 |
| 4,346,008 A | 8/1982 | Leighton et al. | |
| 4,563,282 A | 1/1986 | Wittmann et al. | |
| 4,617,122 A | 10/1986 | Kruse et al. | |
| 4,639,315 A | 1/1987 | Fuchs et al. | |
| 4,655,920 A | 4/1987 | Ragnegard | |
| 4,707,258 A * | 11/1987 | Drori | B01D 25/34 210/333.1 |
| 4,710,294 A | 12/1987 | Ziller | |
| 4,781,835 A | 11/1988 | Bahr et al. | |
| 4,814,093 A | 3/1989 | Frykhult | |
| 4,822,486 A * | 4/1989 | Wilkins | B01D 33/067 210/170.09 |
| 4,838,910 A | 6/1989 | Stollenwerk et al. | |
| 4,865,732 A | 9/1989 | Garrant et al. | |
| 4,871,457 A * | 10/1989 | Drori | B01D 25/34 210/333.1 |
| 4,935,130 A * | 6/1990 | Sieksmeyer | C02F 3/302 210/151 |
| 4,935,136 A * | 6/1990 | Drori | B01D 25/327 210/333.1 |
| 4,950,403 A | 8/1990 | Hauff et al. | |
| 4,956,088 A * | 9/1990 | Hindstrom | B01D 33/21 210/327 |
| 5,037,562 A | 8/1991 | Tarves, Jr. | |
| 5,076,924 A | 12/1991 | Persson et al. | |
| 5,084,174 A | 1/1992 | Perala et al. | |
| 5,087,358 A | 2/1992 | Massignani | |
| 5,158,691 A * | 10/1992 | McEwen | B01D 29/114 210/791 |
| 5,181,945 A * | 1/1993 | Bodovsky | B01D 46/26 210/499 |
| 5,227,065 A | 7/1993 | Strid | |
| 5,242,590 A | 9/1993 | Thomson et al. | |
| 5,296,143 A | 3/1994 | Frykhult | |
| 5,296,152 A * | 3/1994 | Frykhult | B01D 33/23 210/780 |
| 5,304,304 A | 4/1994 | Jakobson et al. | |
| 5,316,675 A * | 5/1994 | Frykhult | B01D 33/807 210/327 |
| 5,326,459 A * | 7/1994 | Hlavach | C02F 3/2806 210/150 |
| 5,330,645 A | 7/1994 | Geldmacher | |
| 5,330,646 A | 7/1994 | Frykhult | |
| 5,474,598 A * | 12/1995 | Harpole, Jr. | B01D 46/26 55/290 |
| 5,503,737 A * | 4/1996 | Luthi | B01D 33/82 210/138 |
| 5,599,446 A | 2/1997 | Junker et al. | |
| 5,618,423 A * | 4/1997 | Lin | B01D 33/073 210/360.2 |
| 5,635,062 A | 6/1997 | Cameron et al. | |
| 5,647,982 A | 7/1997 | Haythornthwaite et al. | |
| 5,667,680 A | 9/1997 | Haeffner | |
| 5,674,396 A * | 10/1997 | Wenzl | B01D 33/09 210/324 |
| 5,679,136 A * | 10/1997 | Phillips | B01D 46/0046 55/290 |
| 5,683,582 A * | 11/1997 | Luthi | B01D 33/09 210/404 |
| 5,685,983 A | 11/1997 | Frykhult | |
| 5,759,397 A | 6/1998 | Larsson et al. | |
| 5,766,466 A | 6/1998 | Peterson | |
| 5,792,352 A | 8/1998 | Scheucher et al. | |
| 5,804,071 A | 9/1998 | Haeffner | |
| 5,820,736 A * | 10/1998 | Bouziane | C10B 1/10 202/136 |
| 5,820,756 A | 10/1998 | McEwen et al. | |
| 5,876,612 A | 3/1999 | Astrom | |

(56) References Cited

U.S. PATENT DOCUMENTS

| | | | |
|---|---|---|---|
| 5,893,972 A | 4/1999 | Peterson | |
| 5,928,396 A | 7/1999 | Choi | |
| 5,951,861 A * | 9/1999 | Strid | B01D 33/76 |
| | | | 210/232 |
| 6,006,554 A | 12/1999 | Gallagher | |
| 6,113,783 A | 9/2000 | Strid et al. | |
| 6,217,637 B1 * | 4/2001 | Toney | B01D 33/073 |
| | | | 95/277 |
| 6,231,761 B1 | 5/2001 | Mohlin et al. | |
| 6,231,764 B1 | 5/2001 | Wilkins | |
| 6,283,306 B1 * | 9/2001 | Nilsson | B01D 33/21 |
| | | | 210/391 |
| 6,447,617 B1 | 9/2002 | Bergmann | |
| 6,461,507 B1 | 10/2002 | Ishigaki et al. | |
| D497,660 S | 10/2004 | Danielsson et al. | |
| 7,255,723 B2 | 8/2007 | Choi et al. | |
| 7,293,659 B2 | 11/2007 | Grace | |
| 7,314,556 B2 | 1/2008 | Sheets et al. | |
| 7,597,805 B2 | 10/2009 | Danielsson et al. | |
| 7,892,424 B2 * | 2/2011 | Mayrand | C02F 3/1242 |
| | | | 210/151 |
| 7,972,508 B2 * | 7/2011 | Danielsson | B01D 33/23 |
| | | | 210/232 |
| 8,118,175 B2 | 2/2012 | Davis et al. | |
| 8,197,201 B2 * | 6/2012 | Mayrand | C02F 3/082 |
| | | | 415/202 |
| 8,343,248 B2 | 1/2013 | Suzuki et al. | |
| 8,409,436 B2 * | 4/2013 | Danielsson | B01D 33/23 |
| | | | 210/232 |
| 8,444,862 B2 * | 5/2013 | Ralvert | B01D 33/50 |
| | | | 210/780 |
| 8,597,391 B1 * | 12/2013 | Dietz | B01D 46/2403 |
| | | | 55/485 |
| 8,801,929 B2 * | 8/2014 | Davis | B01D 29/012 |
| | | | 210/331 |
| 8,808,542 B2 * | 8/2014 | Davis | B01D 33/11 |
| | | | 210/331 |
| 8,852,434 B2 * | 10/2014 | Larsson | B01D 33/23 |
| | | | 210/331 |
| 8,926,843 B2 * | 1/2015 | Baker | B01D 33/503 |
| | | | 210/744 |
| 8,961,785 B2 * | 2/2015 | Danielsson | B01D 33/21 |
| | | | 210/232 |
| 9,023,208 B2 * | 5/2015 | Davis | B01D 29/012 |
| | | | 210/331 |
| 9,028,692 B2 * | 5/2015 | Petit | B01D 33/11 |
| | | | 210/331 |
| 9,339,745 B2 * | 5/2016 | Davis | B01D 33/067 |
| 9,604,162 B2 * | 3/2017 | Hoefken | B01D 33/763 |
| 9,770,684 B1 * | 9/2017 | Kelyman | B01D 46/0071 |
| 10,046,261 B2 * | 8/2018 | Dietz | B01D 46/0056 |
| 10,188,971 B2 * | 1/2019 | Danielsson | B01D 33/21 |
| 10,207,210 B2 * | 2/2019 | Petit | B01D 29/012 |
| 10,589,201 B2 * | 3/2020 | Larsson | B01D 33/803 |
| 10,596,505 B1 * | 3/2020 | Dietz | B01D 46/0023 |
| 10,729,994 B2 * | 8/2020 | Svensson | B01D 33/15 |
| 2002/0050283 A1 | 5/2002 | Bergmann | |
| 2002/0195388 A1 | 12/2002 | Sierens et al. | |
| 2004/0232076 A1 | 11/2004 | Zha et al. | |
| 2005/0082217 A1 | 4/2005 | Hagg et al. | |
| 2005/0121381 A1 | 6/2005 | Sheets et al. | |
| 2008/0035584 A1 * | 2/2008 | Petit | B01D 33/50 |
| | | | 210/780 |
| 2008/0245707 A1 | 10/2008 | Smith | |
| 2009/0020483 A1 * | 1/2009 | Davis | B01D 33/23 |
| | | | 210/784 |
| 2009/0020484 A1 * | 1/2009 | Davis | B01D 29/012 |
| | | | 210/784 |
| 2009/0250386 A1 * | 10/2009 | Mayrand | C02F 3/082 |
| | | | 210/151 |
| 2011/0024347 A1 | 2/2011 | Larsson et al. | |
| 2012/0298573 A1 * | 11/2012 | Davis | B01D 29/012 |
| | | | 210/404 |
| 2012/0325753 A1 | 12/2012 | Baker et al. | |
| 2013/0043179 A1 | 2/2013 | Bugg | |
| 2013/0105382 A1 * | 5/2013 | Strid | B01D 33/21 |
| | | | 210/391 |
| 2013/0153486 A1 | 6/2013 | Danielsson et al. | |
| 2013/0228506 A1 | 9/2013 | Ralvert | |
| 2013/0256219 A1 * | 10/2013 | Oldfield | C02F 3/103 |
| | | | 210/608 |
| 2013/0299408 A1 * | 11/2013 | Olenberg | B01D 33/463 |
| | | | 210/232 |
| 2014/0123494 A1 | 5/2014 | Bailey | |
| 2014/0124461 A1 * | 5/2014 | Buisson | B01D 33/804 |
| | | | 210/780 |
| 2014/0346104 A1 * | 11/2014 | Ekberg | B01D 39/2075 |
| | | | 210/323.1 |
| 2014/0360950 A1 * | 12/2014 | Davis | B01D 33/50 |
| | | | 210/784 |
| 2015/0008194 A1 | 1/2015 | Davis et al. | |
| 2015/0190740 A1 * | 7/2015 | Danielsson | B01D 33/23 |
| | | | 210/236 |
| 2015/0224429 A1 * | 8/2015 | Massignani | B01D 33/466 |
| | | | 210/247 |
| 2015/0246302 A1 * | 9/2015 | Petit | B01D 33/11 |
| | | | 210/780 |
| 2015/0265951 A1 * | 9/2015 | Frommann | B01D 33/463 |
| | | | 210/323.1 |
| 2015/0290564 A1 * | 10/2015 | Hoefken | B01D 33/23 |
| | | | 210/331 |
| 2015/0290565 A1 * | 10/2015 | Hoefken | B01D 33/23 |
| | | | 210/331 |
| 2015/0290566 A1 * | 10/2015 | Luukkanen | B01D 33/21 |
| | | | 210/797 |
| 2016/0045871 A1 * | 2/2016 | Liebermann | B01D 33/21 |
| | | | 210/321.68 |
| 2016/0121245 A1 * | 5/2016 | Ekberg | B01D 33/23 |
| | | | 210/222 |
| 2016/0129377 A1 * | 5/2016 | Stewart | B01D 33/50 |
| | | | 210/107 |
| 2017/0043284 A1 * | 2/2017 | Petit | C02F 1/004 |
| 2017/0157540 A1 * | 6/2017 | Svensson | C02F 1/001 |
| 2019/0224597 A1 * | 7/2019 | Harden | B01D 36/04 |
| 2019/0255468 A1 * | 8/2019 | Larsson | B01D 33/11 |

FOREIGN PATENT DOCUMENTS

| | | |
|---|---|---|
| CA | 2149090 A1 | 11/1996 |
| CN | 1281378 A | 1/2001 |
| CN | 1557525 A | 12/2004 |
| CN | 1742133 A | 3/2006 |
| CN | 1753716 A | 3/2006 |
| DE | 2505565 A | 8/1976 |
| DE | 9319221 U1 | 2/1994 |
| EP | 0247445 A1 | 12/1987 |
| EP | 1090665 A2 | 4/2001 |
| EP | 1205265 A2 | 5/2002 |
| EP | 1596958 A1 | 11/2005 |
| EP | 1961475 A1 | 8/2008 |
| FR | 2595957 A1 | 9/1987 |
| GB | 861751 A | 2/1961 |
| GB | 957991 A | 6/1964 |
| GB | 1278629 A | 6/1972 |
| JP | 2002126800 A | 5/2002 |
| JP | 2008119608 A | 5/2008 |
| SE | 224131 C1 | 1/1969 |
| SE | 526692 C2 | 10/2005 |
| WO | 9112067 A1 | 8/1991 |
| WO | 9419088 A1 | 9/1994 |
| WO | 9735656 A1 | 10/1997 |
| WO | 9811972 A1 | 3/1998 |
| WO | 9930797 A1 | 6/1999 |
| WO | 2000037159 A1 | 6/2000 |
| WO | 0076620 A1 | 12/2000 |
| WO | 02085487 A1 | 10/2002 |
| WO | 03039712 A1 | 5/2003 |
| WO | 03051487 A1 | 6/2003 |
| WO | 2004076026 A1 | 9/2004 |
| WO | 2008002240 A1 | 1/2008 |

(56) References Cited

FOREIGN PATENT DOCUMENTS

| WO | 2008021270 A2 | 2/2008 |
| WO | 2009011864 A1 | 1/2009 |
| WO | 2012030285 A1 | 3/2012 |

OTHER PUBLICATIONS

Algas, Algas Thickener, Feb. 3, 2004, 4 pages, Moss, Norway.
Algas, More than NOK 2 Million Measures, Feb. 3, 2004, 1 page.
Algas, Raw Water Treatment, Feb. 3, 2004, 1 page.
Envirex, Rex Microscreens, Bulletin—Product Features and Benefits, 1989, 12 pages, Waukesha, Wisconsin USA.
Envirex, Rex Microscreens, Bulliten No. 315-31, 1989, 8 pages, Waukesha, Wisconsin, USA.
Envirex, Rex Rotary Drum Vacuum Filters, at least as early as Aug. 1, 2005, 6 pages, Waukesha, Wisconsin USA.
GL&V Dorr-Oliver, The American Disc Filter, Bulliten 7202, 2000, 7 pages.
Hans Huber AG, Huber Technology, Rotafilt Cloth Filtration Plant, Aug. 1997, 5 pages, Germany.
Material re: 1999 Hydrotech Installation at Anniston, AL Wastewater Treatment Plant.
Material re: 2002 Hydrotech Installation (Filtertype HSF2110-2F; Serial No. 2931) at Casale Wastewater Treatment Plant.
Material re: 2002 Hydrotech Installation (Filtertype HSF3112-2F; Serial Nos. 3013 et seq.) at Pero Wastewater Treatment Plant.
Material re: Hydrotech Disc Filter (Filtertype HSF1702-1H; Serial No. 2351; 2000).
Material re: Hydrotech Disc Filter (Filtertype HSF2108-1F; Serial No. 2455; 2001).
Nordic Water Products AB, Efficient Filtration with DynaDisc Filter, at least as early as Aug. 1, 2005, 8 pages, Sweden.
Safronov, A. I., "Examination Report", Eurasian Patent Application No. 201990073/31, dated Apr. 6, 2020, 2 pages.
Hilt, Daniel, "Extended European Search Report", European Patent Application No. 17840336.6, dated Jan. 23, 2020, 7 pages.
Thomas, Shane, "International Search Report", International Application No. PCT/US2017/046496, dated Oct. 24, 2017, 2 pages.
Moon, Kihwan, "International Preliminary Report on Patentability", International Application No. PCT/US2017/046496, dated Feb. 12, 2019, 6 pages.

* cited by examiner

DISC FILTER PRE-SCREEN DUAL MEDIA DISC FILTER

RELATED APPLICATIONS

This application claims priority under 35 U.S.C. § 119(e) to U.S. Provisional Application Ser. No. 62/374,097, titled "DISC FILTER PRE-SCREEN DUAL MEDIA DISC FILTER," filed on Aug. 12, 2016, which is herein incorporated by reference in its entirety.

BACKGROUND

Technical Field

The technical field relates generally to wastewater treatment processes, and more particularly, to media filtration in wastewater treatment processes.

Background Discussion

Water filtration processes typically include primary, secondary, and tertiary processes to treat wastewater to remove contaminants, such as suspended solids, biodegradable organics, phosphorous, nitrogen, microbiological contaminants, and the like, to provide a clean effluent.

The first or primary treatment process typically involves mechanically separating large solids and other suspended matter in the wastewater from the less dense solids and liquid in the wastewater. Primary treatment processes are typically done in sedimentation tanks using gravity and provide a primary effluent.

Secondary treatment typically includes biological treatment of the primary effluent. The biological treatment units or vessels used for secondary treatment typically include bacteria that break down components of the wastewater, such as organic components. The biological treatment processes in the biological treatment units or vessels may reduce the total organic content and/or biochemical oxygen demand of the wastewater. This is typically done by promoting the consumption of the carbonaceous and nutrient material by bacteria and other types of beneficial organisms already present in the wastewater or mixed into the wastewater.

Tertiary processes typically involve removing suspended solids and any remaining contaminants or pollutants from the wastewater so that the remaining water can be either reused or disposed of safely in the environment. Tertiary processes can include filtration and/or the addition of any one or more of chemicals, UV light, and ozone.

Many wastewater treatment plants utilize a disc filter system to filter water. Such systems typically include a plurality of discs that each comprise a plurality of filter segments. Each filter segment includes a pair of filter panels which are spaced apart and arranged on an outer surface of a central drum. A cap is attached to the top of each pair of filter panels to form a pocket shaped filter segment for receiving water. Each filter panel includes filter media, such as finely woven cloth, for filtering water.

Each filter panel is attached to the drum by a filter support arrangement. Each filter support includes a plurality of support openings which provide fluid communication between adjacent filter segments. This enables water and air to flow circumferentially between adjacent filter segments as the drum rotates.

In operation, the drum is rotated and the water to be filtered is introduced into the drum. The water then exits through ducts in the drum and flows into filter segments inside the filter support. The water in the filter support is then filtered through the media of the filter panels to provide filtered water. The filtered water is then collected in a chamber and exits the disc filter through an effluent pipe. Particulates which are filtered out by the filter panels remain within the filter segments on the inside surface of the filter media of the filter panels. A spray device is used to spray the panels with water to dislodge the particulates and clean the filter media. The particulates are then collected onto a trough and removed from the disc filter system.

Openings in the central drum that function to provide a passageway for the water to be transferred into the interior of the filter discs are typically larger than the openings of the filter media on the filter panels. Influent wastewater having high Total Suspended Solids (TTS) levels will therefore clog the filter media more quickly, which reduces throughput. Furthermore, objects in the wastewater, such as rags and other large objects may flow through the openings in the drum into the interior of the filter panels and become trapped. This results in the loss of effective filter panel filtration area and thus a loss of efficiency. For example, in order to remove these large objects, the disc filter has to be taken offline and the filter panels have to be removed and cleaned, which is both labor intensive and time consuming.

SUMMARY

Aspects and embodiments are directed to a two-stage filtration system for filtering wastewater that includes a first stage filter assembly that is disposed sequentially to and upstream from a second stage filter assembly.

According to an aspect of the present disclosure, a filter device for filtering wastewater is provided. The filter device comprises a drum filter including a rotary drum with a filter surface having a first side facing an interior of the drum and a second side facing an exterior of the rotary drum and being fluidly connectable with a source of wastewater, and a disc filter having an inlet fluidly connectable with the first side of the filter surface of the rotary drum.

In some embodiments, the disc filter includes a plurality of disc-shaped filter members attached to a central drum that are configured to receive filtered wastewater passed through the filter surface of the drum filter and to filter the filtered wastewater. In one embodiment, the inlet of the disc filter is fluidly connectable with an interior of the central drum of the disc filter. In another embodiment, the rotary drum of the drum filter and the central drum of the disc filter are positioned along a common longitudinal axis. In some embodiments, the rotary drum of the drum filter is coupled to the central drum of the disc filter.

According to a another embodiment, the disc filter further comprises a housing that at least partially surrounds the drum filter and the disc filter, the housing having an inlet trough fluidly connectable with the wastewater and the second side of the filter surface of the rotary drum filter, an outlet trough fluidly connectable with filtrate, and a sealing plate configured to separate the inlet trough from the outlet trough.

In some embodiments, the disc filter further comprises a drum filter collection trough fluidly connectable with the exterior of the rotary drum.

In some embodiments, the disc filter further comprises a backwashing system. According to one embodiment, the backwashing system comprises a first plurality of spray nozzles configured to spray filtrate onto the plurality of disc-shaped filter members, a disc filter backwash trough configured to collect backwashed filtrate from the plurality of disc-shaped filter members, and a second plurality of spray nozzles configured to spray filtrate onto the first side of the filter surface of the rotary drum, wherein the drum filter collection trough is configured to collect backwash from the filter surface of the rotary drum.

According to at least one embodiment, the filter surface of the rotary drum is configured to retain solids on the second side while permitting the wastewater to filter through the filter material to the first side of the filter material and the interior of the rotary drum as filtered wastewater. In some embodiments, the filter surface of the drum filter has openings with a diameter in a range of about 20 microns to about 800 microns. According to certain embodiments, the filter surface of the drum filter comprises one of wedge wire screen material or woven filter media material. In one embodiment, the plurality of disc-shaped filter members include a filter media with openings having a diameter in a range of about 6 microns to about 300 microns.

According to some embodiments, the wastewater is from one of a secondary or primary treatment process.

According to another aspect of the present disclosure, a two-stage filtration system for filtering wastewater is provided that includes an inlet fluidly connectable with the wastewater, a first stage filter assembly fluidly connectable with the inlet and having a rotary drum with a filter surface configured for radially inward fluid flow, a second stage filter assembly fluidly connectable with the first stage filter assembly and having a plurality of filter discs configured for radially outward fluid flow, and an outlet fluidly connectable with filtrate generated by the second stage filter assembly.

In some embodiments, the plurality of filter discs are attached to a central drum that is fluidly connectable with an interior of the rotary drum of the first stage filter assembly.

According to at least one embodiment, the first stage filter assembly and the second stage filter assembly are rotatable around a common longitudinal axis, and the system further comprises a drive assembly coupled to the first stage filter assembly and the second stage filter assembly. In another embodiment, the two-stage filtration system further includes a backwashing system having a first plurality of spray nozzles configured to spray the filtrate onto the plurality of filter discs and a second plurality of spray nozzles configured to spray the filtrate onto an inwardly facing side of the filter surface of the rotary drum.

In another embodiment, the two-stage filtration system further includes a level sensor configured to provide measurements of a level of wastewater provided by the inlet to the first stage filter assembly. In a further embodiment, the two-stage filtration system further includes a controller operatively coupled to the level sensor, the drive assembly, and the backwashing system, the controller configured to control at least one of the drive assembly and the backwashing system based on measurements from the level sensor. In some embodiments, the filter surface of the drum filter has openings with a diameter in a range of about 20 microns to about 800 microns. In some embodiments, the filter discs include a filter media with openings having a diameter in a range of about 6 microns to about 300 microns.

In some embodiments, the inlet of the two-stage filtration system is fluidly connectable with a secondary clarifier of a secondary treatment process. In other embodiments, the inlet is fluidly connectable with influent to a primary treatment process.

According to one embodiment, the second stage disc filter assembly includes a central drum configured to receive filtered wastewater from the first stage filter assembly, the central drum including a plurality of drum apertures, a frame comprising a plurality of frame supports each having an attachment portion coupled to the central drum and a radial strut portion extending from the attachment portion, each of the plurality of frame supports defining a single frame aperture that extends through the attachment portion and along an entire length of the radial strut portion to correspond with the shape of the frame support, and a plurality of adjacent filter segments positioned around the central drum, each of the plurality of adjacent filter segments defining a cavity in fluid communication with at least one of the plurality of drum apertures and supported at a first side by a first frame support and at a second side by a second frame support, the plurality of frame apertures and cavities arranged to form a circumferential open fluid channel extending continuously around the central drum to enable the filtered wastewater to pass substantially unimpeded through the plurality of drum apertures and through the plurality of adjacent filter segments. In some embodiments, the single frame aperture forms an inverted substantially T-shaped configuration.

According to another aspect of the present disclosure, a method of treating wastewater is provided. The method includes introducing the wastewater to a first-stage filtration operation comprising a barrier filter to produce filtered wastewater, and introducing the filtered wastewater to a second-stage filtration operation comprising a disc filter to produce treated water.

In some embodiments, the method further includes measuring a level of the wastewater introduced to the barrier filter of the first stage filtration operation. In another embodiment, the method further includes backwashing a filter surface of the barrier filter based on the measured level of wastewater. In some embodiments, the barrier filter comprises a rotary drum configured for radially inward fluid flow. In some embodiments, the disc filter is configured for radially outward fluid flow.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. For purposes of clarity, not every component may be labeled in every figure. In the figures:

DETAILED DESCRIPTION

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments. For example, the teachings of this invention apply not only to an "outside-in" type drum filter connected to an "inside-out" disc filter, but also apply to other types of filter configurations, including an "inside-out" type drum filter connected to an "outside-in" disc filter.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

While the invention illustrated herein is described as being employed in a wastewater treatment setting, and particularly as a tertiary treatment system, other uses and arrangements are possible. For example, the invention may be used as a primary wastewater treatment system. Other wastewater treatment applications include use as a secondary clarifier in a municipal wastewater treatment plant. In addition to wastewater treatment uses, the present invention can also be used for filtering water used in industrial and manufacturing processes, such as wood, paper, and food industries, as well as production facilities.

Figure 1A:
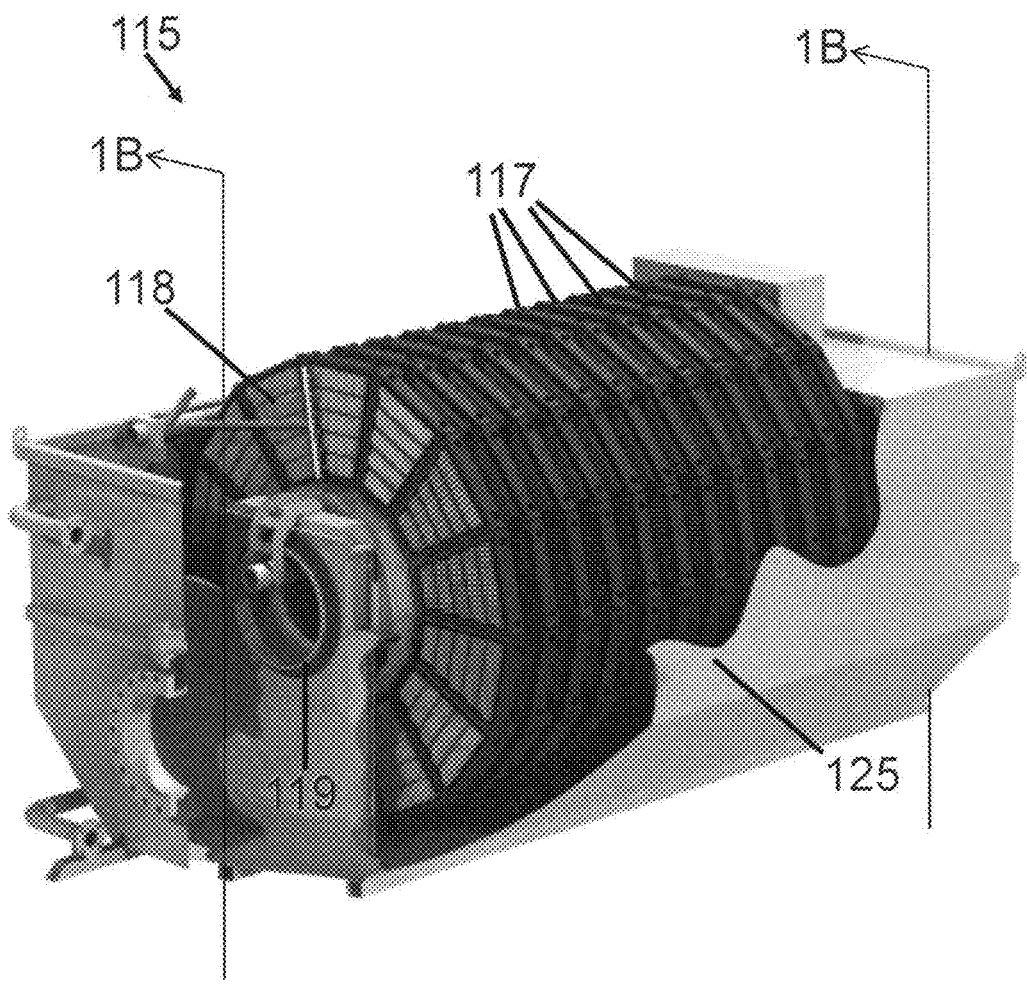
FIG. 1A is a partial cut-away perspective view of a disc filter in accordance with one or more aspects of the invention.
Figure 1B:
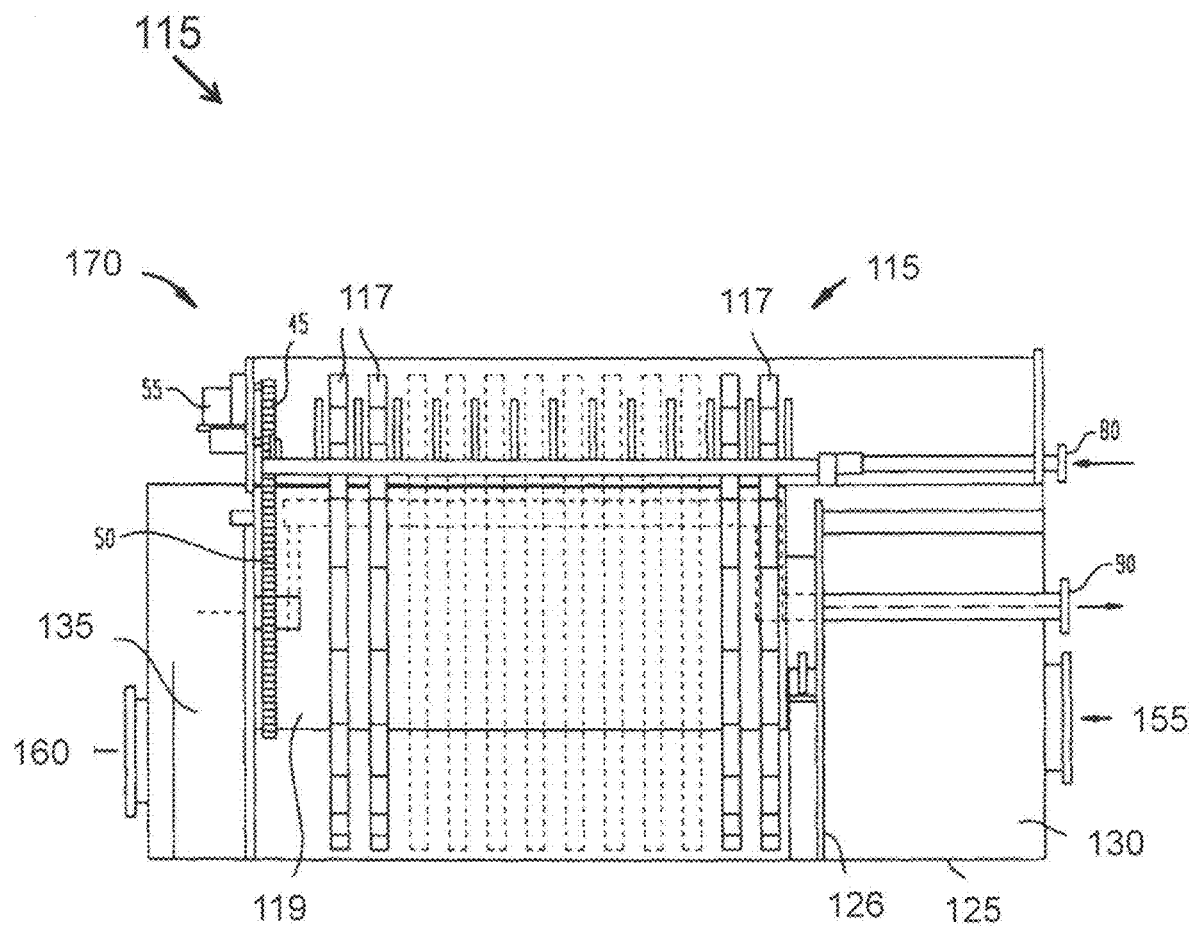
FIG. 1B is a cross-sectional side view of the disc filter of FIG. 1A taken along section line 1B.

As discussed above, rotary disc filters may be used to remove suspended solids from water. Examples of suitable disc filters that may be used in accordance with aspects of the invention are discussed in PCT Application Nos. PCT/US2007/017847 and PCT/US2008/008671, each of which is incorporated herein by reference in its entirety. FIGS. 1A and 1B illustrate a possible rotary disc filter 115, also referred to herein as simply a "disc filter" or "disc filter assembly." Suitable examples of disc filters for use with the invention include the Forty-X™ disc filters manufactured by Evoqua Water Technologies, although other disc filters may be used.

The disc filter 115 configuration shown in FIGS. 1A and 1B employs a filter media 118 that is pleated filter media. The filter media 118 may be woven or non-woven. In addition, pile cloth, needle felt, microfiltration, nanofiltration, reverse osmosis, or other membranes may be employed as media constructions. Non-limiting examples of materials for use in making filter media include polyester, metal-coated polyester, antimicrobial-coated polyester, polypropylene, nylon, stainless steel wire, glass fiber, alumina fiber, glass filled polypropylene (e.g., 17%), glass-filled acetal, glass-filled nylon, or any combination thereof. It should also be noted that the term "filter media" should be interpreted broadly to cover any component that filters a fluid. Other terms included within the definition of filter media include membrane, element, filter device, and the like. As such, the term "filter media" should not be narrowly interpreted to exclude any component that filters fluid.

Referring back to FIGS. 1A and 1B, disc filter 115 comprises a housing 125, such as a metal tank that substantially encloses a central drum 119 that is configured to rotate and supports a plurality of disc-shaped filter members or filter discs 117. It will be appreciated that variations on this design, including those employing a frame intended to facilitate mounting of the unit in a concrete tank, may also be used.

The disc filter 115 also includes a drive assembly 170. The drive assembly 170 includes at least two bearings that support the central drum 119 for rotation. A driven sprocket 50 is coupled to the central drum 119 and a drive sprocket 45 is coupled to a motor 55 or other prime mover. In the illustrated construction, a belt engages the drive sprocket 45 and the driven sprocket 50 such that rotation of the motor 55 produces a corresponding rotation of the central drum 119. In preferred constructions, the sprockets 45, 50 are sized to produce a significant speed reduction. However, some constructions may employ a slow speed drive with no speed reduction if desired. While the illustrated construction employs a belt drive, other constructions may employ gears, shafts, chains, direct drive, or other means for transferring the rotation of the motor 55 to the central drum 119.

The disc filter 115 also includes an influent pipe 155 (also referred to herein as an inlet to the housing) that directs influent into an interior 65 (see FIG. 4A) of the central drum 119, an effluent pipe 160 (also referred to herein as an outlet to the housing) that directs filtered fluid from an outlet trough or chamber 135 defined within the housing 125 out of the disc filter 115. The disc filter 115 may also include a spray water pipe 80 that provides high-pressure water to a plurality of spray nozzles 147 (see FIG. 11) that is periodically used to clean the filter media 118. A backwash pipe 90 transports the spray water after use and directs it out of the disc filter 115.

The spray bars 190 may be positioned between adjacent filter discs 117 and at the ends of the disc filter 115 to enable the spraying of high-pressure water in a reverse flow direction through the pleated filter media 118 to provide backwashing of the filter media 118. Because the filter media 118 is pleated and thus angled with respect to the plane of the filter discs 117, the use of nozzles (147) that are similarly angled may provide for more efficient backwash cycles.

Thus, the nozzles are angled approximately 45 degrees off of a normal direction to the planes of the filter discs 117. In addition, two nozzles may be provided at each spray point, with the nozzles angled with respect to one another at about 90 degrees such that both sides of the pleats are sprayed directly during the backwashing. In some instances, a straight on direct spray may be utilized. In addition, bouncing spray off the filter media at an angle improves the cleaning effect and efficiency for a given amount of backwash flow and spray velocity.

The disc filter 115 of FIGS. 1A and 1B employs a plurality of filter discs 117 to increase the overall filter area. The number and size of the filter discs 117 can be varied depending on the flow requirements of the system. For example, additional filter discs 117 can be attached to the central drum 119 to increase the capacity of the disc filter 115 without having to pass additional flow through any of the already existing filter discs 117. According to various embodiments, the disc filter 115 is configured as an "inside-out" configuration, meaning that water to be filtered enters the central drum 119 and flows from the central drum 119 into the filter discs 117, and from there outwardly through the filter media 118, as described further below. This type of configuration may also be referred to herein as radially outward fluid flow.

Figure 2A:
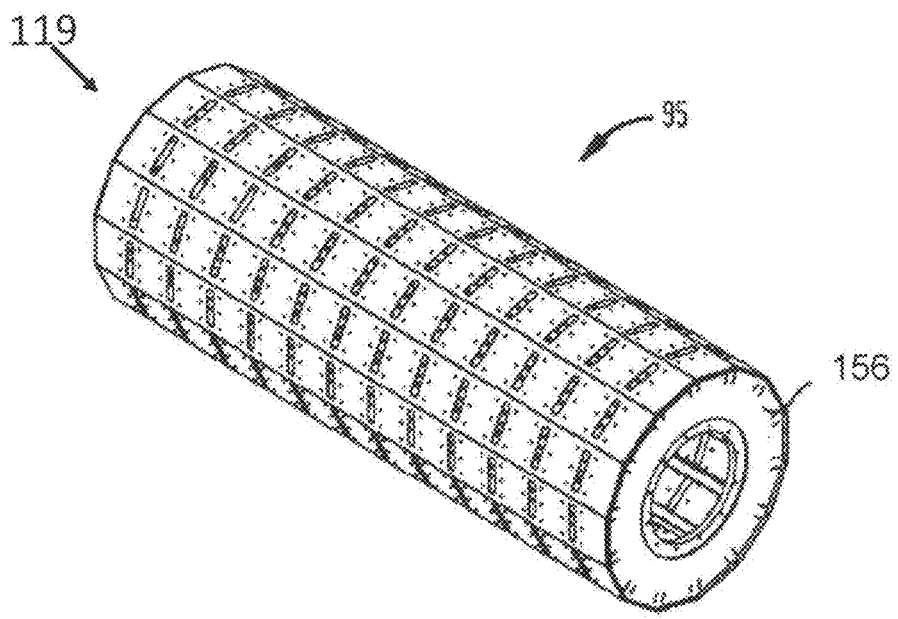
FIG. 2A is a perspective view of a drum typically used in the disc filter of FIGS. 1A and 1B.
Figure 2B:
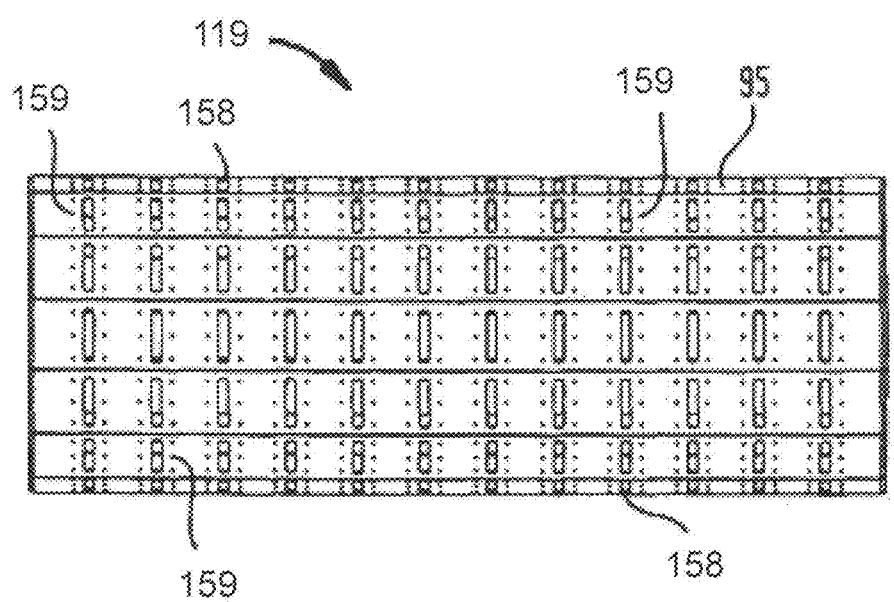
FIG. 2B is a side view of the drum of FIG. 2A.

FIGS. 2A and 2B illustrate a possible central drum 119 configuration that may be used in accordance with one or more embodiments. The central drum 119 includes an outer surface 95 and two end surfaces 156 that cooperate to define an interior space. One end is open to permit flow and the other end is sealed against flow. Several drum apertures 158 are arranged in a series of axial rows with each row including a number of drum apertures 158 that extend circumferentially around a portion of the outer surface 95. The drum apertures 158 are rectangular although it is understood that other shapes may be suitable. Attachment apertures 159 are positioned on either side of each drum aperture 156. Each drum aperture 158 is associated with a set of attachment apertures 159. As illustrated in FIG. 2A, the outer surface 95 of the central drum 119 includes a number of flat planar surfaces that contact one another to define a polygonal cross section. It is to be appreciated that a circular cross section or a cylindrical or other shape is also within the scope of this disclosure.

Figure 3:
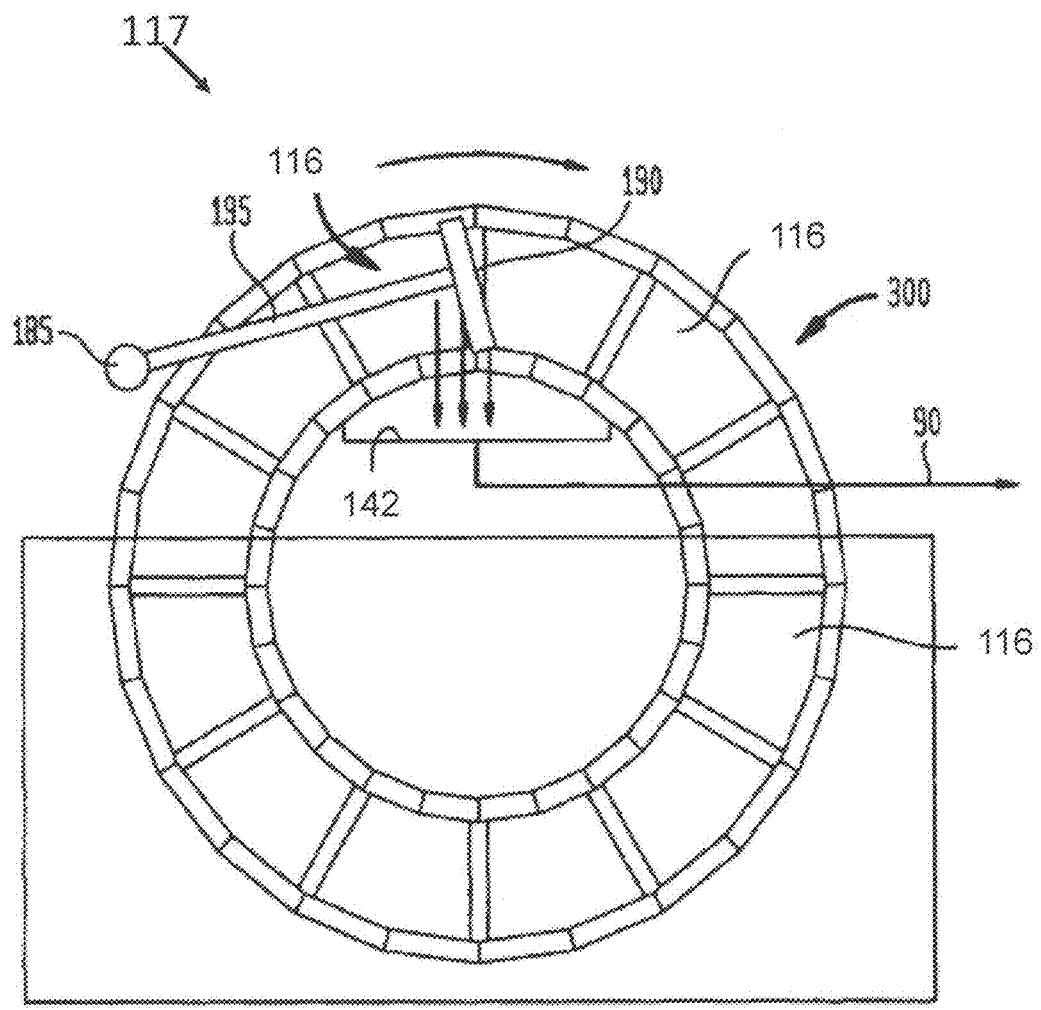
FIG. 3 is a side view of a portion of a disc filter.

Referring to FIG. 3, a side view of one of the filter discs 117 of FIGS. 1A and 1B is shown. Each filter disc 117 includes a plurality of filter panel sets 300. Each filter panel set 300 includes two associated filter panels 116. In FIG. 3, one of the filter panels 116 from each panel set 300 is shown. The filter disc 117 in FIG. 3 depicts twelve filter panels 116 and thus filter disc 117 includes a total of twenty four filter panels 116. However, it is to be appreciated that other constructions may employ more or fewer filter panels 116 as desired.

After filtering, and during rotation of the central drum 119, the filter panels 116 exit the liquid and pass the spray bars 190. During a backwash cycle, spray nozzles 147 (see FIG. 11) are used to spray the filter panels 116 with high-pressure water or chemicals to dislodge the particulates and clean the filter media 118 as the central drum 119 rotates. The water droplet impact vibration and penetration of the filter media 118 by a portion of the water removes debris that is caught on the upstream surface of the pleated filter media 118. The debris and water are collected in the trough 142 and transported out of the disc filter 115 by backwash pipe 90.

Figure 4A:
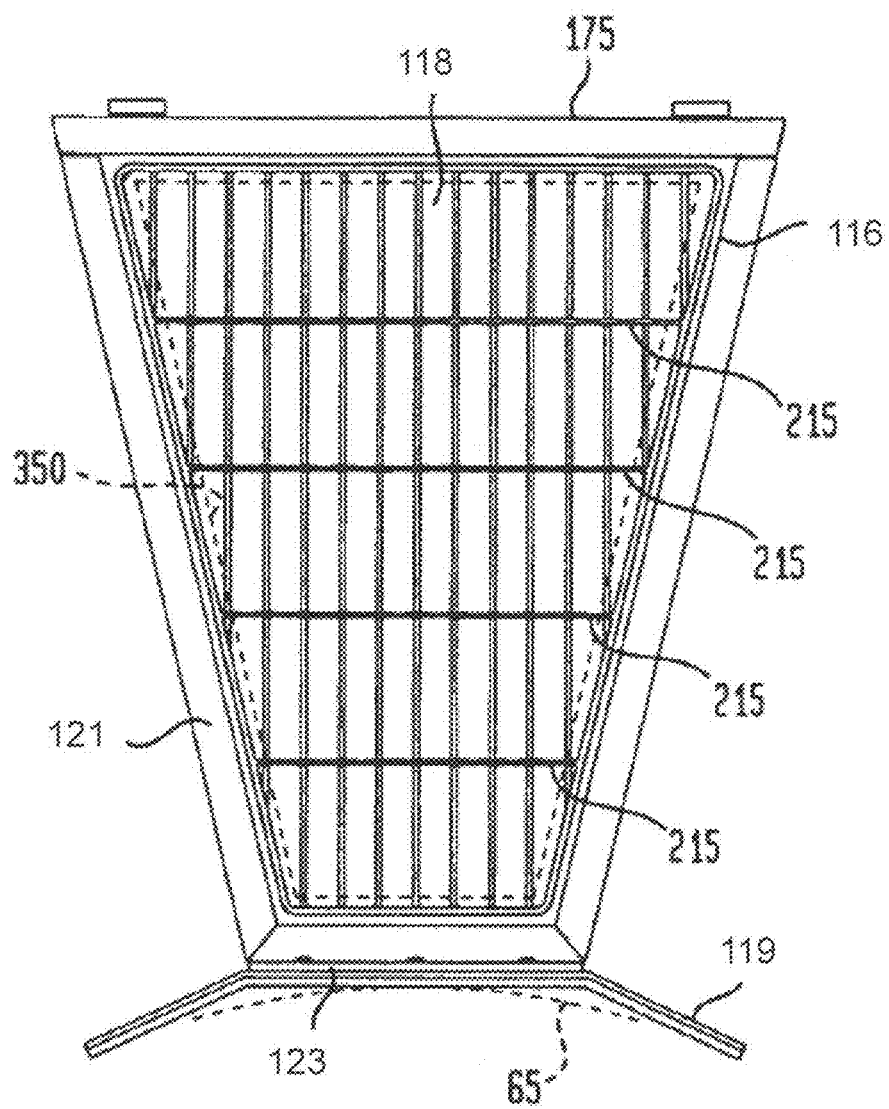
FIG. 4A is a front view of a filter panel in a support frame attached to a central drum in a disc filter.
Figure 4B:
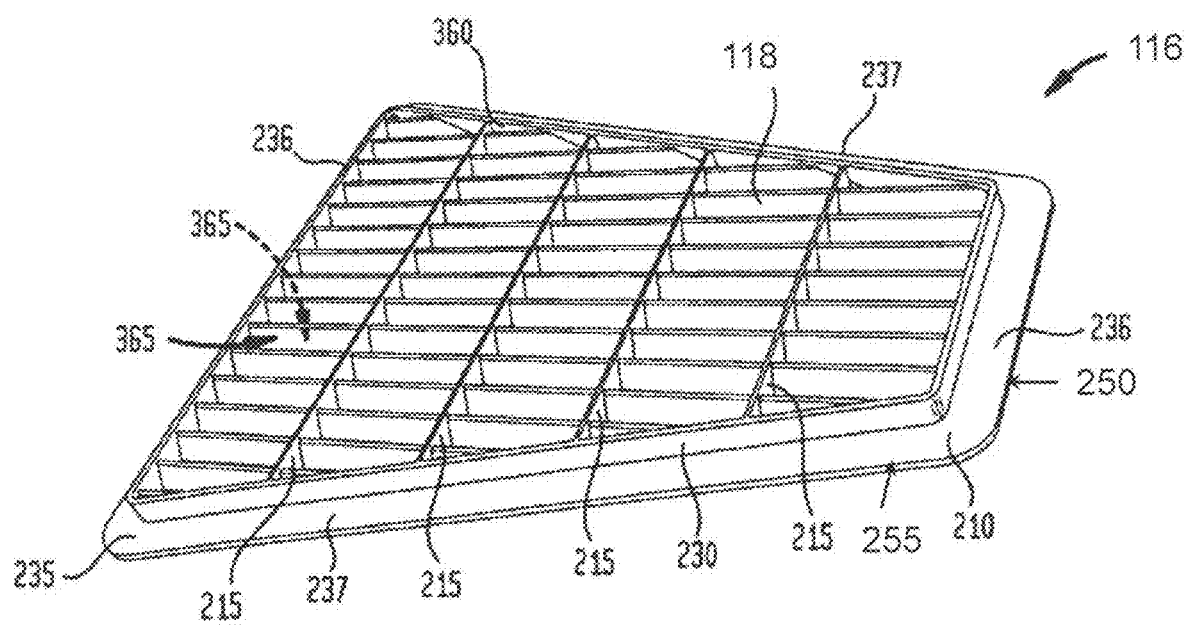
FIG. 4B is a perspective view of the filter panel of FIG. 4A.

FIGS. 4A and 4B illustrate possible arrangements of the filter panels 116. FIG. 4A illustrates the panel 116 mounted in the support structure 121. FIG. 4B illustrates a pleated panel. The filter panels 116 include a pleated filter media 118, a perimeter frame 210, and several support gussets or stringers 215. In some constructions, the stringers 215 are molded as an integral part of the frame 210 with other attachment means also being suitable for use. In some constructions, the pleated filter media 118 is formed from a single piece of material that is sized and shaped to fit within the perimeter frame 210. In the illustrated constructions, the pleats extend in a substantially radial direction with other orientations also being possible. In one construction, a stainless steel screen is employed as the filter media 118. Other constructions may employ woven polyester, cloth, or other materials. The materials used and the size of the openings (also referred to herein as pore size) are chosen based on the likely contaminates in the effluent, the flow rate of the effluent, as well as other factors. In one embodiment, the openings are in a range of 10 and 30 microns in diameter. Smaller and larger openings are also within the scope of this disclosure. For example, in some applications, the filter media may have openings that are in a range of 6 to 300 microns in diameter. According to another example, the filter media has openings that are about 100, 150, or 200 microns in diameter. As indicated in the examples discussed below, according to some embodiments, the filtrate 122 generated by the disc filter may have a TSS concentration of less than 5 mg/L.

Figure 4C:
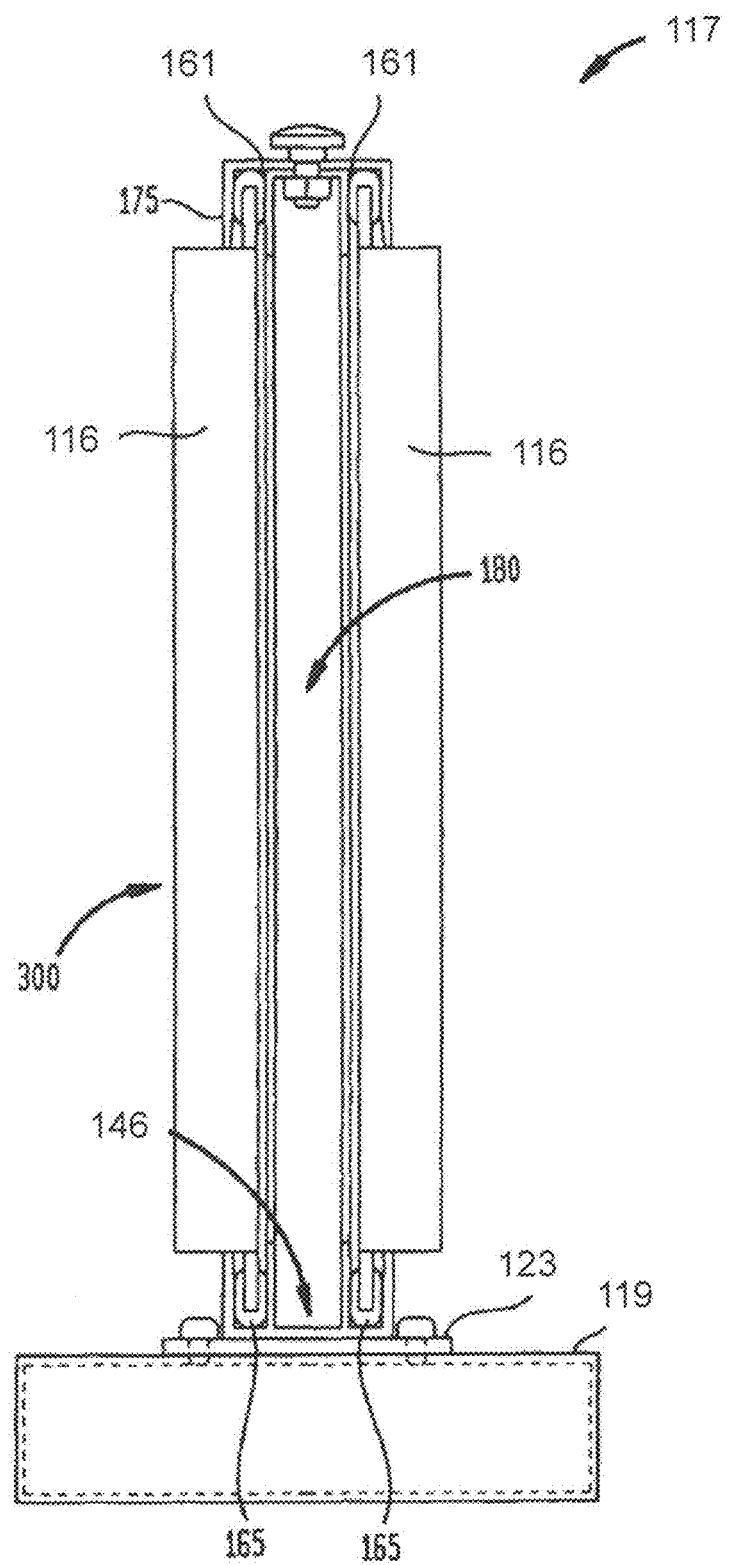
FIG. 4C is a side view of the filter panel of FIG. 4A with a portion of a support structure removed.

As illustrated in FIG. 4B, one construction of the frame 210 is formed with a cross section of an angled member that includes a flow-parallel leg 230 and a flow-transverse leg 235. The flow-transverse leg 235 receives the respective inner diameter seal 165 as illustrated in FIG. 4C, and provides additional stiffness to the flow-parallel legs 230. The flow-parallel legs 230 are sized to substantially match the peak-to-peak height of the pleated filter media 118. The frame 210 also includes two substantially parallel sides 236 and two non-parallel sides 237 that are arranged such that they are substantially radial with respect to the central drum 119.

Referring to FIG. 4C, one of the filter panel sets 300 is shown. FIG. 4C is a side view of FIG. 4A with a right portion of a support structure 121 (see FIG. 4A) removed. The filter panels 116 are mounted in the support structure 121 such that the filter panels are spaced apart from each other. An attachment plate 123 having an aperture 146 engages the attachment apertures 159 around a drum aperture 158 to attach the support structure 121 to the central drum 119. A cap 175 is located over a top portion of the filter panels 116. The filter panels 116, the support structure 121 in which they are mounted, the cap 175, and the attachment plate 123 define a partially enclosed space 180. The partially enclosed space 180 extends circumferentially around the central drum 119 through each filter panel set 300 on the filter disc 117. Fluid is able to pass from within the central drum 119, through the drum aperture 158 and aperture 146 in the attachment plate 123 and into the enclosed space 180 to enable fluid to flow circumferentially within each filter panel set in the filter disc 117. A perimeter seal 165 is located on a perimeter 161 of each filter panel 116 and serves to inhibit leakage of water from around the filter panel 116.

Referring to FIG. 1B in conjunction with FIG. 3, the spray water pipe 80 extends the full length of the disc filter 115 and defines a distribution manifold 185. A spray bar 190 is positioned between adjacent filter discs 117 and at each end of the disc filter 115. A distribution pipe 195 extends between the manifold 185 and the spray bar 190 to provide for fluid communication of high-pressure water to the spray bar 190. The spray bar 190 includes nozzles that spray water onto the filter panels 116 to periodically clean the filter panels 116 as described in greater detail below with reference to FIG. 11.

A disc filter backwash trough 142 is positioned beneath the spray bar 190 between adjacent filter discs 117 to catch the spray water or backwash, including any particulate matter removed from the filter panels 116. The backwash and particles are then removed from the disc filter 115 via the backwash pipe 90.

As mentioned above, openings in the central drum 119 (e.g., apertures 158) provide a passageway for water to be sent into the interior of the filter panels (e.g., enclosed space 180). Since the openings or pore size of the filter media 118 is smaller than these openings, solids that are larger than the pore size opening become attached to the filter media. In addition, larger objects such as rags can also flow through the drum openings and become trapped in the interior of the filter panels, which not only reduces filter panel filtration area but also decreases efficiency since the disc filter has to be taken offline to remove these larger trapped objects since the backwash process is ineffective at removing such large objects.

In accordance with one or more embodiments, a two-stage filtration system for filtering wastewater is provided that addresses the problems discussed above related to the trapped solids. The two-stage filtration system includes a drum filter, also referred to herein as a "barrier filter" that functions as a first stage filtration process that is positioned upstream from a disc filter that functions as a second stage filtration process. The drum filter functions as a preceding filter or a pre-filter which provides a certain degree of filtering to a second stage filtration process such as the disc filter. For instance, the drum filter may be configured to remove material that is larger than 100 microns, including large debris from plant upsets caused by storm surges, etc. The drum filter may be directly attached to the disc filter such that the drum filter acts as an extension of the disc filter and functions to protect the disc filter from large debris and foreign objects. Influent wastewater passes through the drum filter first, as a first stage filtration operation. The drum filter removes larger particulates and generates filtered wastewater that is then directed through the disc filter. The disc filter functions as a second state filtration operation by removing finer particulates from the filtered wastewater that passed through the drum filter to generate filtrate.

Figure 5A:
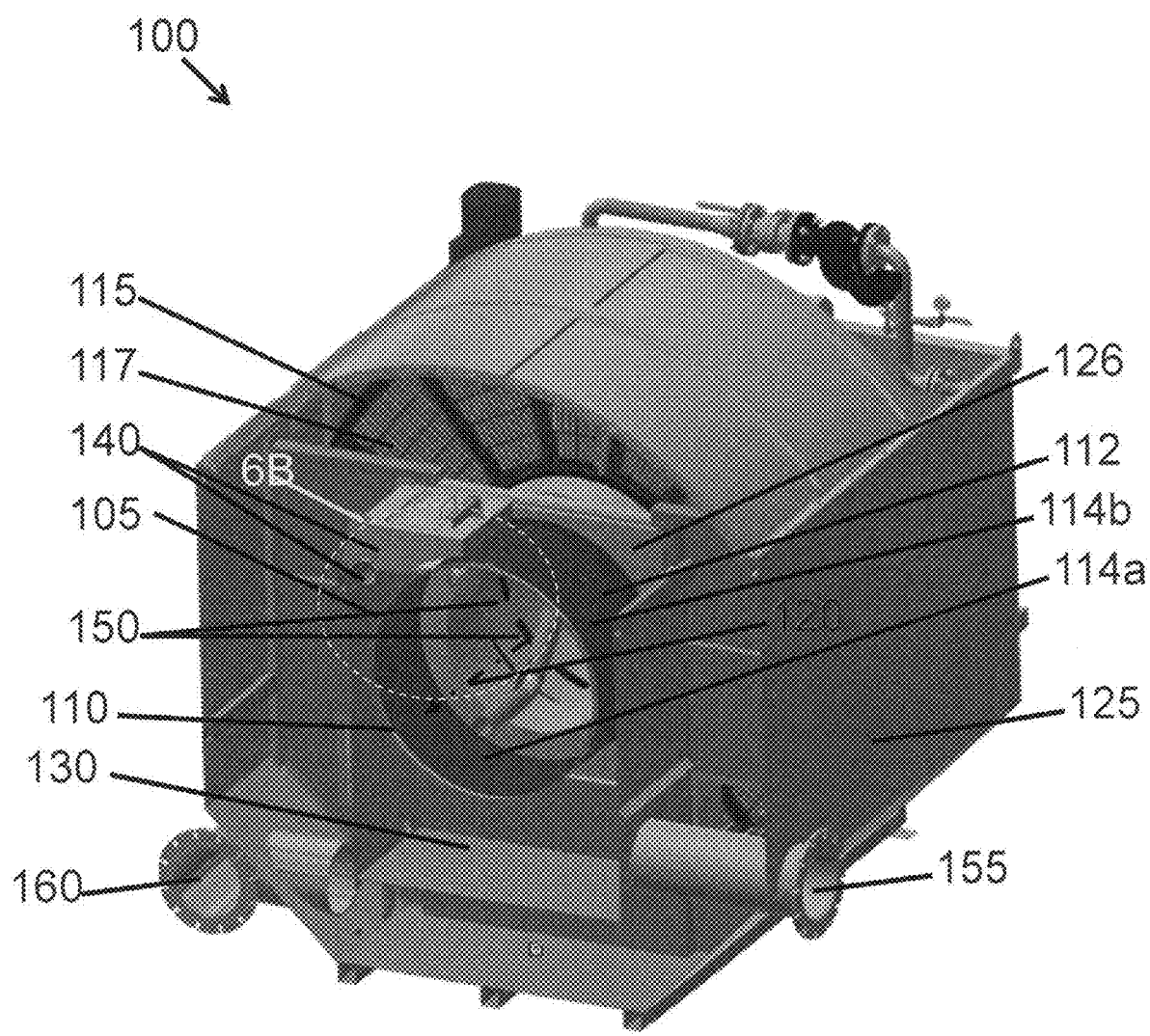
FIG. 5A is a perspective view of two-stage filtration system in accordance with one or more aspects of the invention.

FIG. 5A is a perspective view of one embodiment of a two-stage filtration system 100, also referred to herein as a "filter device." The filter device 100 includes a drum filter 105, also referred to herein as a "first stage filter assembly" or a "first stage drum filter assembly," and a disc filter 115, also referred to herein as a "second stage filter assembly" or a "second stage disc filter assembly." The drum filter 105 includes a rotary drum 110 and the disc filter 115 includes a central drum 119. The rotary drum 110 and the central drum 119 are positioned along a common longitudinal axis 120. The drum filter 105 and the disc filter 115 are disposed within a housing 125 that at least partially surrounds the drum filter 105 and the disc filter 115. The configuration shown in FIG. 5A has a front panel of the housing 125 that is removed to show the drum filter 105 and other features of the filtration system 100. Referring back to the disc filter 115 FIG. 1B, the drum filter 105 may be positioned in the space defined by the inlet trough 130 of the housing 125.

Figure 5B:
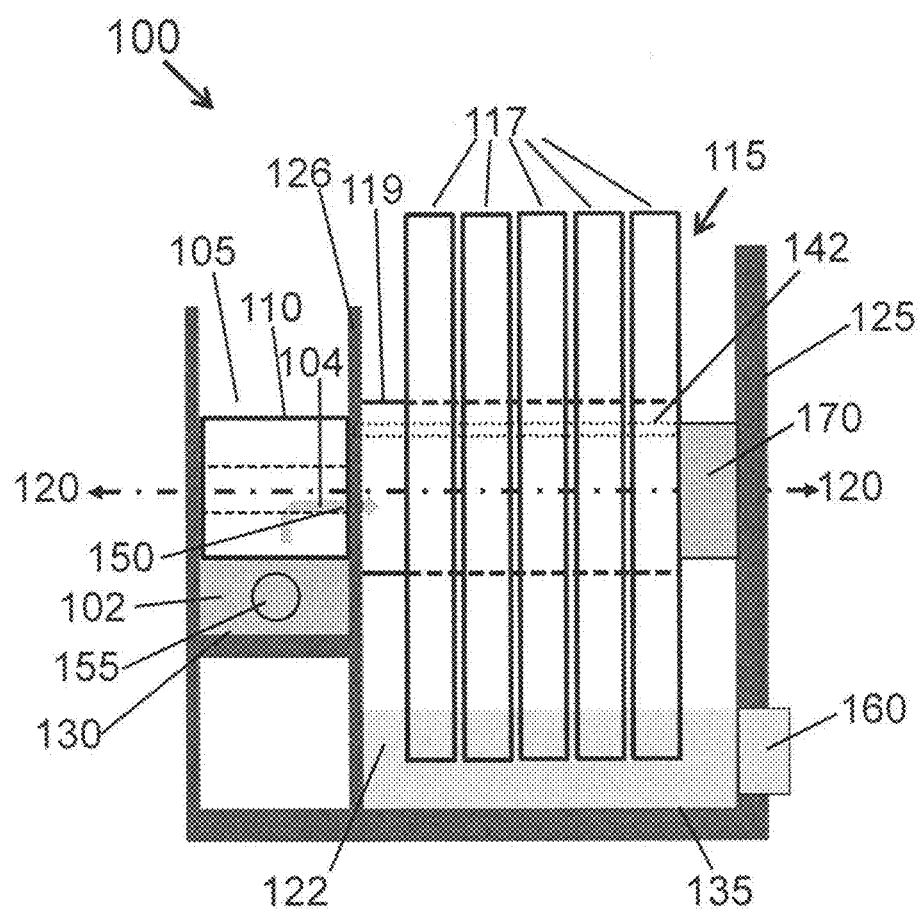
FIG. 5B is a cross-sectional side view of a two-stage filtration system in accordance with one or more aspects of the invention.

FIG. 5B is a side view of a two-stage filtration system 100. The housing 125 includes an inlet 155 for receiving wastewater 102 to be filtered that collects in an inlet trough 130 that is in fluid communication or otherwise fluidly connectable with the rotary drum 110 of the drum filter 105. As discussed in further detail below, the wastewater 102 passes through the filter surface 112 of the drum filter 105 as filtered wastewater 104. The filtered wastewater 104 that has been filtered by the drum filter 105 enters one or more openings 150 in the central drum 119 of the disc filter 115 to the interior of the central drum 119 where it is then transferred to the filter discs 117 of the disc filter 115. The filtered wastewater 104 then passes through the filter media 118 of the filter discs 117 and collects in an outlet trough 135 of the housing 125 as filtrate 122. An outlet 160 of the housing 125 allows for filtrate 122 to exit the system. The two-stage filtration system 100 may also include a sealing plate 126 that is configured to separate the inlet trough 130 from the outlet trough 135 and a drive assembly 170 that functions to rotate the rotary drum 110 of the drum filter 105 and the central drum 119 of the disc filter 115.

Figure 10:
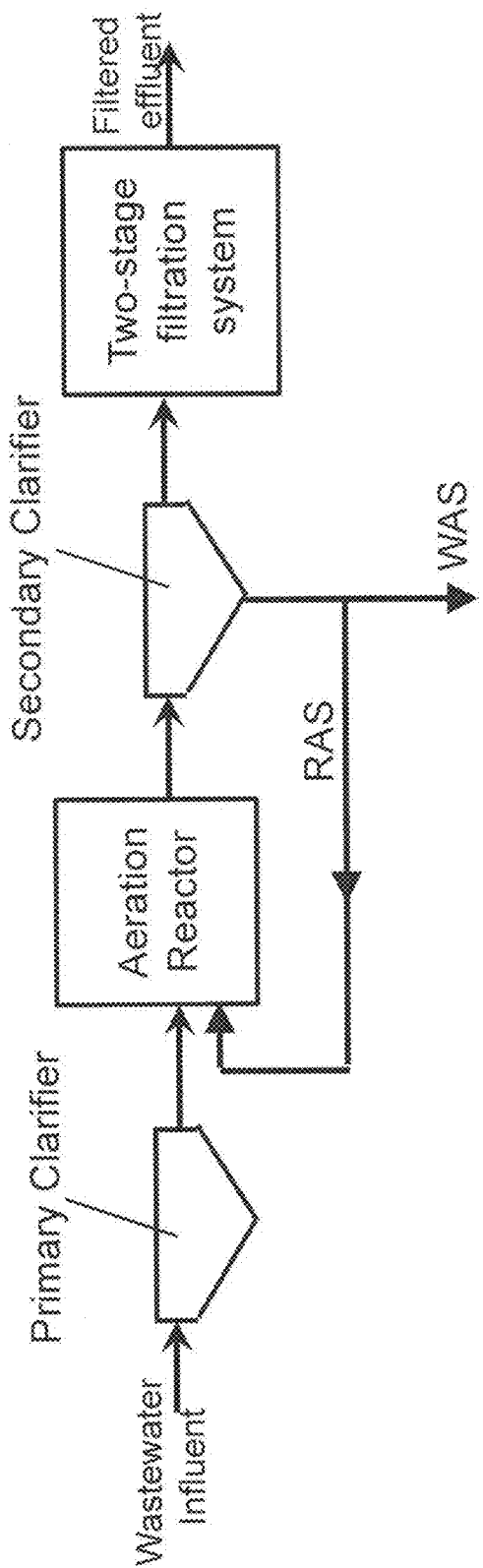
FIG. 10 is a schematic flow diagram of a wastewater treatment process that includes a two-stage filtration system in accordance with one or more aspects of the invention.

The housing 125 includes an inlet 155 that is in fluid communication or otherwise fluidly connectable with wastewater to be filtered 102. The wastewater to be filtered 102 may be piped to the inlet from any one of a number of various sources. In some embodiments, the wastewater 102 is from a previous wastewater treatment process, including any one of a primary, secondary, or tertiary treatment process. According to one embodiment, the wastewater 102 is from a secondary treatment process, and the two-stage filtration system 100 may function as at least a portion of a tertiary treatment process. For example, the wastewater 102 may be sourced from a secondary clarifier of a secondary treatment process, as shown in FIG. 10. According to other embodiments, the wastewater 102 may be influent to a primary treatment system (i.e., "wastewater influent" in FIG. 10), and the two-stage filtration system 100 may function as at least a portion of a primary treatment process.

According to some embodiments, the wastewater 102 has a concentration of total suspended solids (TSS), also referred to herein as simply "suspended solids" in a range of approximately 10-30 mg/L. In other embodiments, the wastewater 102 has a TSS concentration that is greater than 30 mg/L, for example, in primary filtration applications and in instances where the wastewater 102 includes storm water runoff or effluent from a clarifier "burping" process, the wastewater 102 may have a concentration in a range of approximately 100-500 mg/L.

The drum filter 105 includes a rotary drum 110 with a filter surface 112 that has a first side 114a that faces an interior of the rotary drum 110 and a second side 114b that faces an exterior of the rotary drum. According to the embodiments discussed herein, the drum filter 105 is configured as an "outside-in" filter, such that wastewater to be filtered 102 (see FIG. 6A) is passed through the filter surface 112 from the second side 114b (exterior of the rotary drum) to the first side 114a (interior of the rotary drum) to generate a filtered wastewater. This type of configuration may also be referred to herein as radially inward fluid flow.

The filter surface 112 of the rotary drum 110 may be any one of a number of different types of filtration media that have openings or pores that allow water to pass through the filter surface but retain solids or other undesirable substances. The size of the openings may depend on the characteristics of the incoming wastewater 102 and/or the type of filter surface 112 used. In some embodiments, the filter surface 112 has openings that are in a range of approximately 1-1000 microns in diameter, and according to one embodiment, the openings in the filter surface 112 have a diameter that is in a range of approximately 20-800 microns, although smaller and larger sized openings for the filter surface of the drum filter are within the scope of this disclosure.

The filter surface 112 may be constructed from any corrosion resistant metal material. In some embodiments, the filter surface 112 is a metal mesh material. Non-limiting examples of metal mesh material include stainless steel, nickel alloys, other metal alloys, brass, bronze, titanium, or any combination thereof. In one embodiment, the filter surface 112 is a wedge wire screen material. In other embodiments, the filter surface 112 is a polymer material. In some embodiments, the filter surface 112 is a woven filter media material.

Figure 6A:
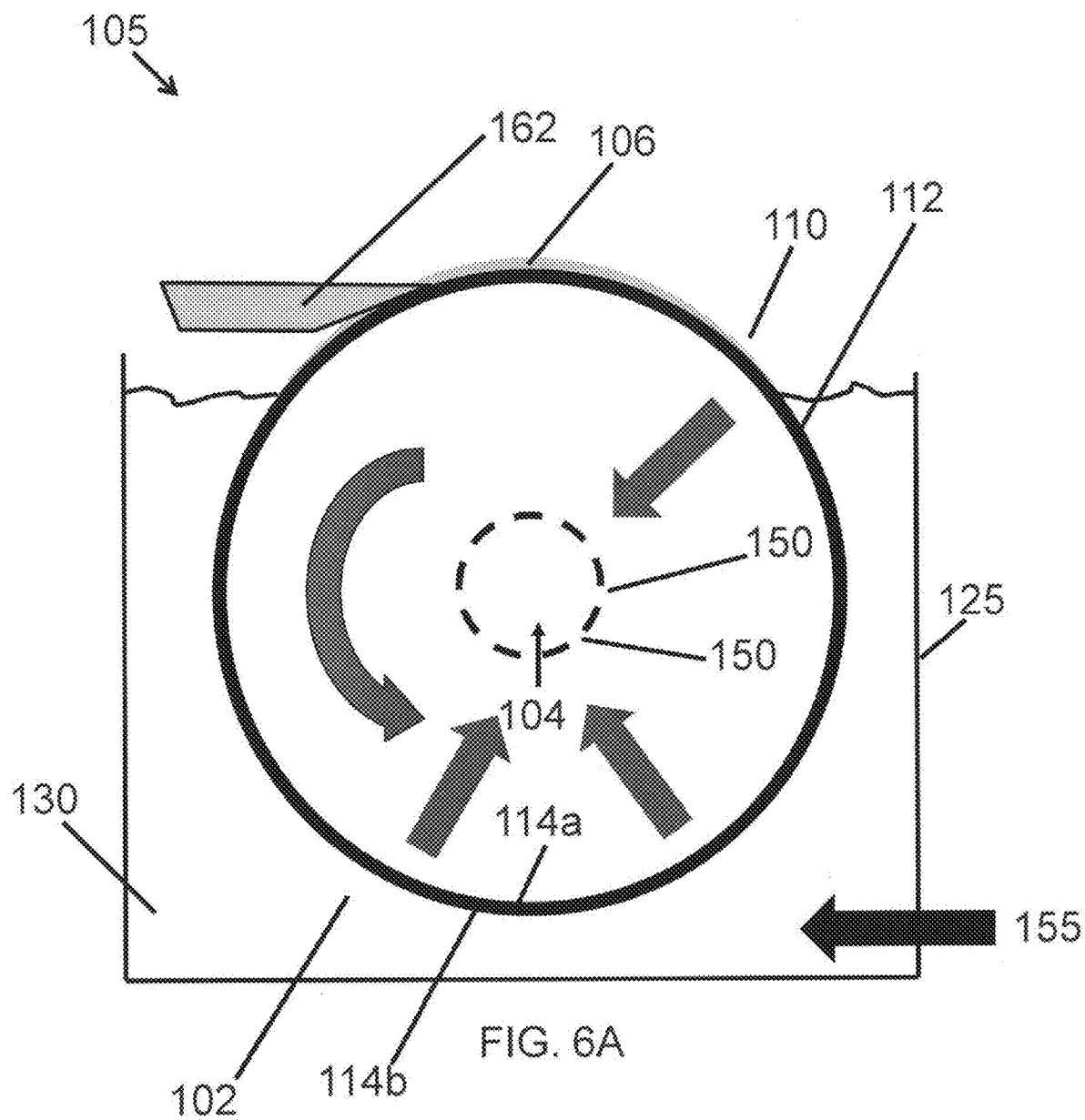
FIG. 6A is a side schematic view of a drum filter in accordance with one or more aspects of the invention.

FIG. 6A shows one example of a filtration operation using the drum filter 105. Wastewater to be filtered 102 enters the inlet trough 130 of the housing 125 through the inlet 155. At least a portion of the rotary drum 110 rests in the wastewater 102. For example, in accordance with one embodiment, a portion of the drum area remains above the water level (see example shown in FIG. 7B indicated a maximum water level) for purposes of accommodating spray nozzles (discussed below and refer to FIGS. 7A and 7B) that spray the filter surface 112 of the rotary drum 110 from the inside out. However, as will be appreciated, according to other designs, the rotary drum 110 may be fully immersed in the wastewater 102. This type of configuration may be useful for removing floatable materials entrained within the wastewater 102.

Referring back to FIG. 6A, at least a portion of the second side 114b of the filter surface 112 is in fluid communication or otherwise fluidly connectable with the wastewater 102. During operation, the drive assembly 170 applies a driving force to the rotary drum 110 to rotate the rotary drum 110 through the wastewater 102. As shown by the arrow in FIG. 6A, the configuration of the drum filter 105 of FIG. 6A indicates that the rotary drum rotates in a counter-clockwise direction, although it is to be appreciated that clockwise rotation is also within the scope of this disclosure.

According to one embodiment, the wastewater 102 flows through the second side 114b of the filter surface 112 to the first side 114a as filtered wastewater 104. Wastewater 102 is forced through the filter surface 112 of the rotary drum 110 by a pressure differential caused by a difference in water height between a high pressure source (water at a higher level) on the outside of the rotary drum 110 (i.e., the presence of the wastewater 102 in the inlet trough 130 that the rotary drum 110 is at least partially immersed in) and the inside of the rotary drum 110, which is at a lower pressure (and lower height water level). The high pressure source on the outside of the rotary drum 110 pushes the wastewater 102 through the filter surface 112 to the inner chamber of the rotary drum 110. The filtered wastewater 104 then flows through one or more openings 150 in the central drum 119 of the disc filter via gravitational forces (see arrows in FIG. 6A). The openings 150 may therefore function as an inlet to the disc filter 119, including the interior of the central drum 119. Referring to the photograph shown in FIG. 6C, a flange 152 or other attachment mechanism may be used to attach the rotary drum 110 of the drum filter 105 to the central drum 119 of the disc filter 115. In some embodiments, the openings 150 in the central drum 119 may be slots, such as those shown in FIG. 6C. The filtered wastewater 102 passes through the openings 150 in the central drum 119 where it is then transferred to the filter discs 117.

Figure 6B:
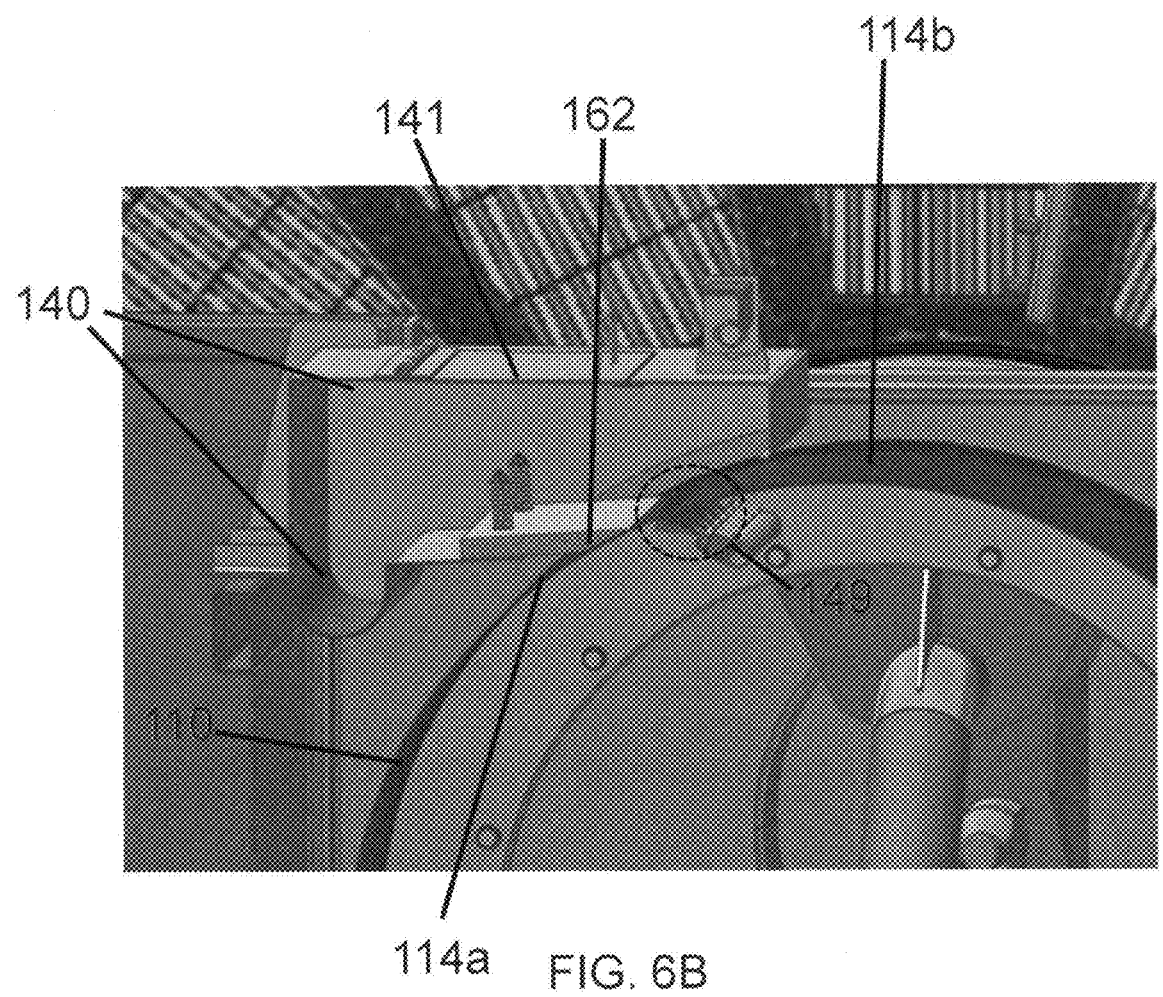
FIG. 6B is an enlarged view of the circled portion (labeled "6B") of FIG. 5A.
Figure 6C:
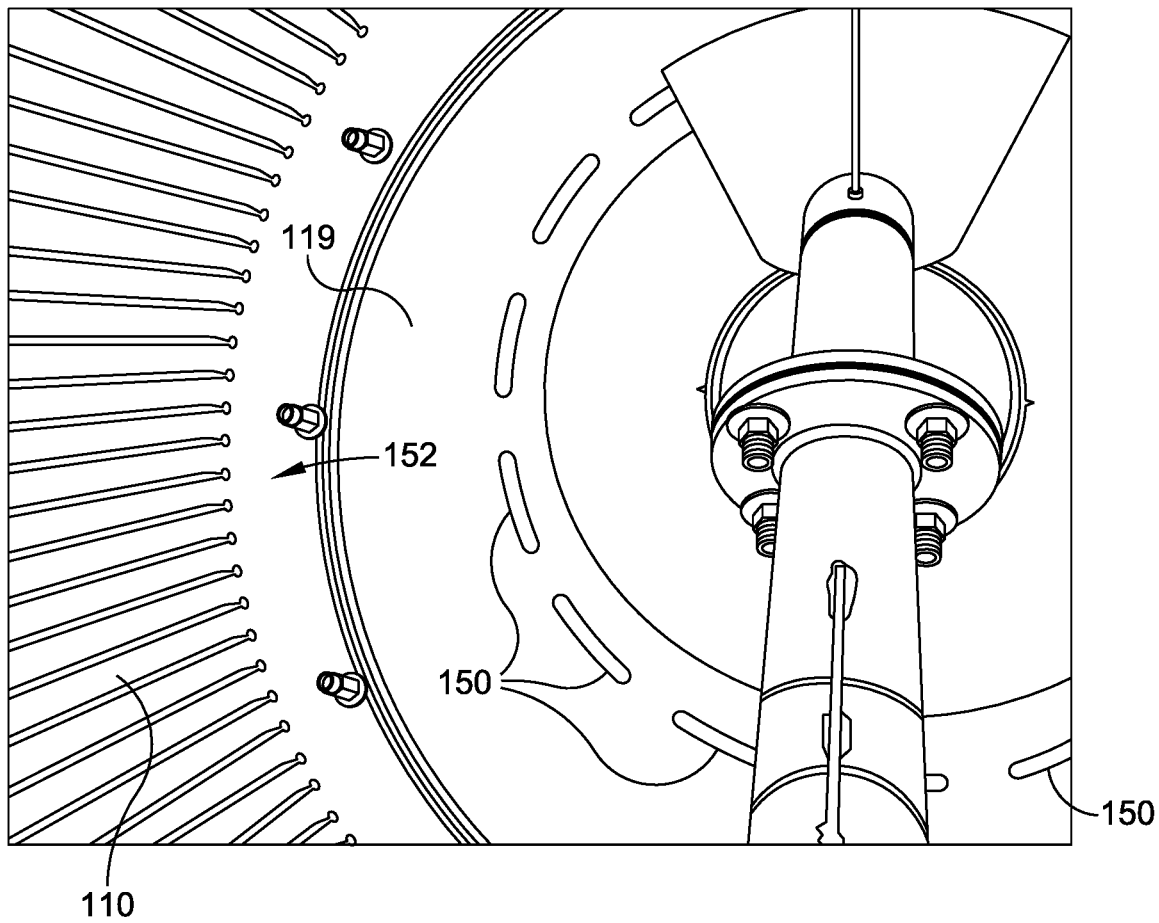
FIG. 6C is a photograph of a drum filter attached to a disc filter in accordance with one or more aspects of the invention.

Solids 106 too large to pass through the openings in the filter surface 112 adhere to the exterior (second side 114b) of the filter surface 112. A doctor blade 162 or other scraping device functions to scrape off or otherwise remove the filtered-out solid substances 106 from the from the second side 114b of the filter surface 112 as the rotary drum 110 rotates, which is shown in FIG. 6B. For instance, a scraping edge of the doctor blade 162 rests against the outer surface of the rotary drum 110 and scrapes the solids 106 off of the outer surface of the filter surface 112 as the rotary drum 110 rotates. The scraped solids 106 pass along a top surface of the doctor blade 162, for example, by the force of gravity, and are collected in a drum filter collection trough 140, which is shown in FIGS. 5A, 6B, 7A, and 7B. The drum filter collection trough 140 is therefore in fluid communication or otherwise fluidly connectable with the exterior of the rotary drum 110. A portion of the drum filter collection trough 140 may be at least partially enclosed by an enclosure 141 (see FIG. 6B) that helps confine the solids 106 and direct them to the collection trough 140. The doctor blade 162 may be mounted to an internal portion of the enclosure 141 and may be spring-loaded or have some other tension adjustment. The enclosure 141 may also include an access point, such as a door, as shown in FIG. 6B, which may be used to manually remove trapped solids and/or to access the doctor blade 162.

Figure 11:
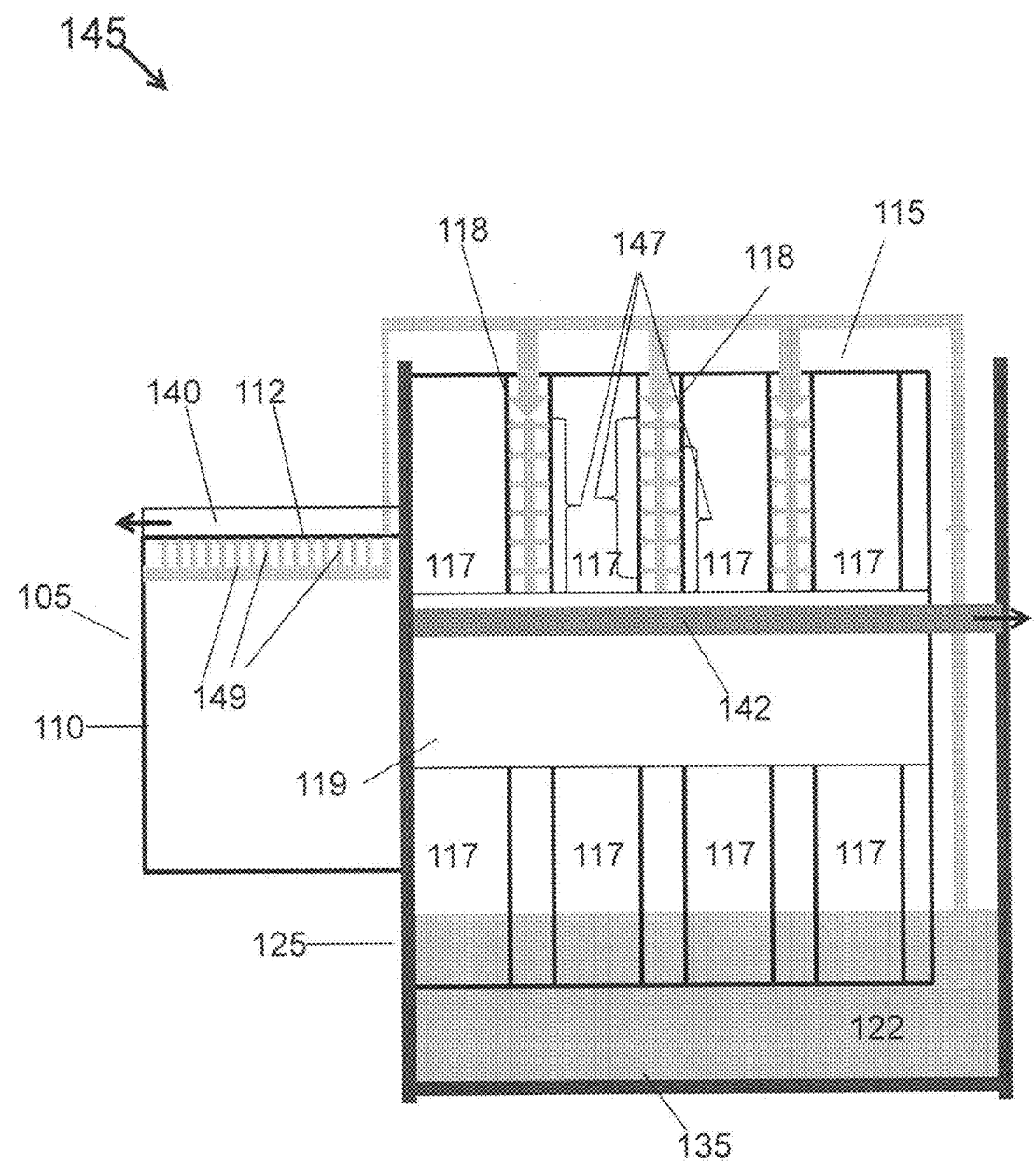
FIG. 11 is a schematic view of a backwash system in accordance with one or more aspects of the invention.

In accordance with at least one embodiment, the filter device 100 also includes a backwash system. The backwash system functions to clean the filter media 118 of the disc filters 117 and the filter surface 112 of the rotary drum 110 at periodic or predetermined intervals. A schematic of a backwash system 145 is shown in FIG. 11. The backwash system 145 includes a first plurality of spray nozzles 147 that are configured to spray filtrate 122 onto the plurality of filter discs 117. During cleaning, the drive assembly 170 turns the filter discs 117 at a low speed (e.g., 1-3 rpm) and filtrate 122 or any other backwash fluid is pumped from the outlet trough 135 of the housing 125 (or any other source of filtrate) to the first plurality of spray nozzles 147 that are positioned at the top of the disc filters 117. The first plurality of nozzles 147 functions to clean the filtered solids off the filter media 118. The configuration shown in FIG. 11 includes spray nozzles 147 that are positioned between two adjacent discs 117 such that both sides of each disc are sprayed from the "clean" side. The filtrate 122 penetrates through the filter media 118 and washes away the collected solids. A disc filter backwash trough 142 is used to collect the collected solids (particulate matter removed from the filter media 118) and used spray water (backwashed filtrate), which is collectively referred to herein as backwash effluent, and transports the backwash effluent out of the disc filter 115, as shown by the arrow in FIG. 11. According to one embodiment, the disc filter backwash trough 142 (also shown in FIG. 5B) is positioned within the central drum 119 of the disc filter 115.

The backwash system 145 also includes a second plurality of spray nozzles 149 configured spray filtrate 122 onto the filter surface 112 of the rotary drum 110. The second plurality of spray nozzles 149 functions in a similar manner as the first plurality of spray nozzles 147. The second plurality of spray nozzles 149 are also shown in FIG. 6B. As shown, the second plurality of spray nozzles 149 are disposed on the interior of the rotary drum 110 and are positioned to spray the "clean" side (first side 114a) of the filter surface 112. While the rotary drum 110 is being rotated (also at a slow speed during backwash), the filtrate 122 or other backwash fluid is pumped to the second plurality of spray nozzles 149 and sprayed onto the first side 114a of the filter surface 112. The filtrate 122 passes through the filter surface 112 to the second side 114b and particulate matter removed from the filter surface 112 and used spray water is collected in the drum filter collection trough 140, which transports the backwash effluent out of the drum filter 105.

According to some embodiments, the first plurality of spray nozzles 147 and/or the second plurality of spray nozzles 149 may include one or more features or elements that minimize or reduce clogging. For instance, the spray nozzles may include a retractable element that includes a split spray tip or other element that is configured to retract into an orifice of the housing of the spray nozzle during non-backwashing operations. When retracted, the split spray tip "splits" outwardly such that debris that would otherwise clog the orifice of the spray nozzle is released. Once pressurized, the retractable element extends outward from the opening and the split spray tip merges back together to form a spray pattern. Suitable nozzles having these features include the MOMOJet® nozzles available from Ikeuchi USA, Inc.

Figure 7A:
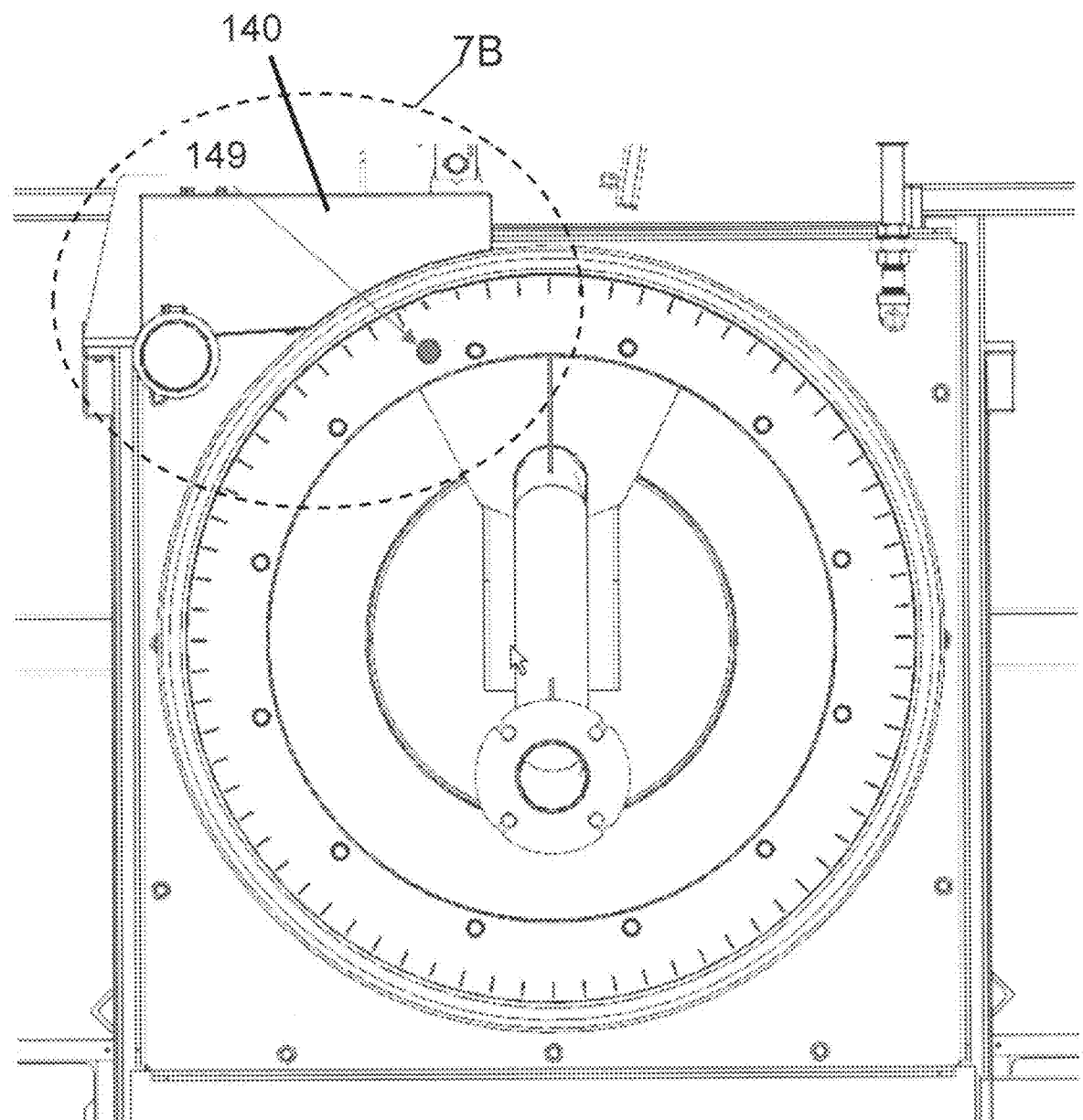
FIG. 7A is a schematic front view of a drum filter in accordance with one or more aspects of the invention.
Figure 7B:
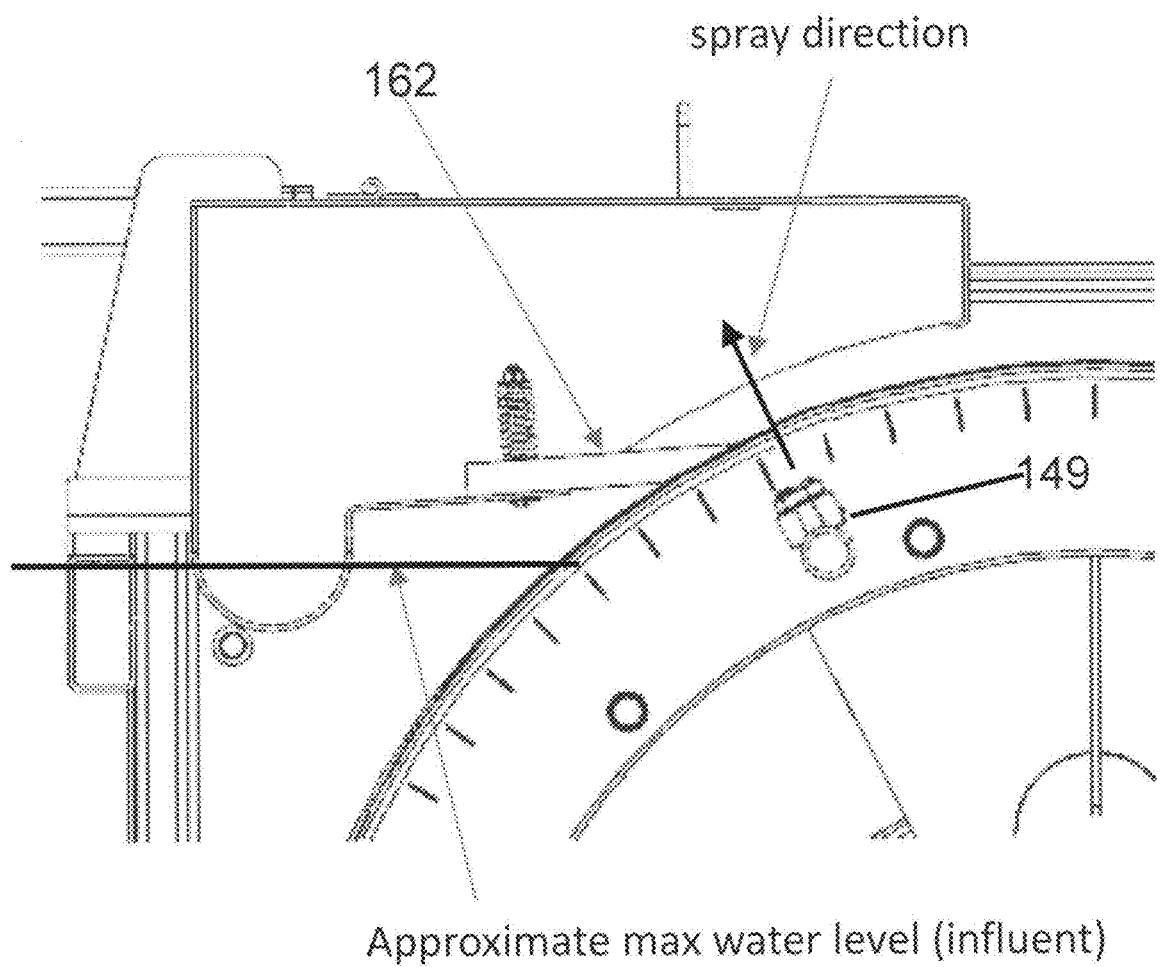
FIG. 7B is an enlarged view of the circled portion (labeled "7B") of FIG. 7A.

As shown in FIG. 6B, The second plurality of spray nozzles 149 are angled and positioned such that the outwardly-directed spray pattern results in the backwash effluent being directed into the drum filter collection trough 140. According to one embodiment, the spray nozzles 149 are positioned to be aligned adjacent to one another across the width of the rotary drum 110. The spray nozzles 149 may also be positioned and angled to coincide with the doctor blade 162 such that the spray nozzles 149 spray at the filter surface 112 in such a way that the doctor blade 162 is more readily able to scrape waste off into the drum filter collection trough 140. In some instances, the angled orientation of the spray nozzles 149 may be 90 degrees to the filter surface 112, but in other configurations, the spray nozzles 149 may not be oriented at 90 degrees. FIG. 7A indicates one potential position for the spray nozzles 149, and FIG. 7B is an enlarged view of the circled portion of FIG. 7A that indicates the placement and approximate spray direction. In this instance, the drum filter collection trough 140 is positioned external to the rotary drum 110, but it is to be appreciated that other locations are also within the scope of this disclosure, including the interior of the rotary drum 110.

Figure 8A:
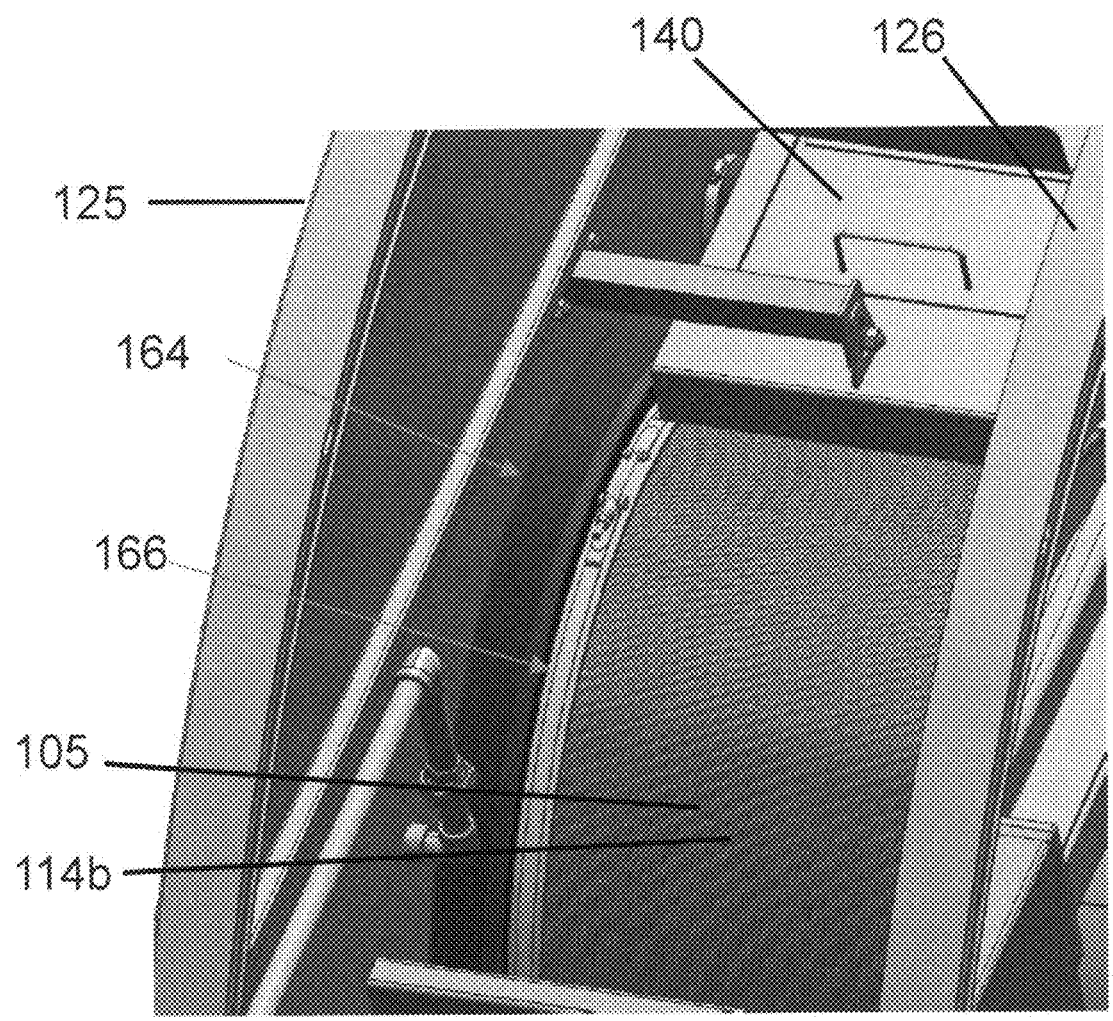
FIG. 8 is a partial perspective view of a top portion of a drum filter in accordance with one or more aspects of the invention.
Figure 9:
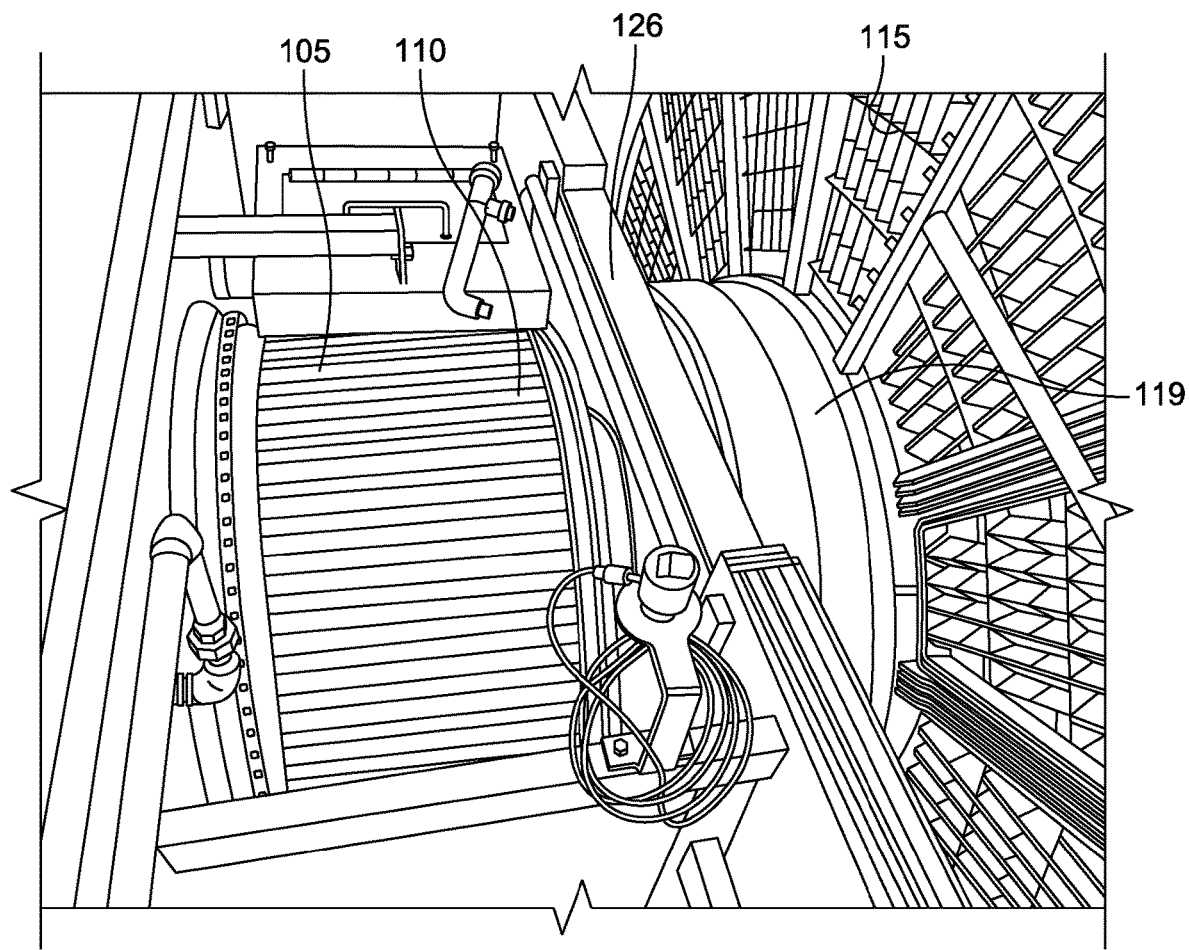
FIG. 9 is a photograph of a drum filter attached to a disc filter in accordance with one or more aspects of the invention.

FIG. 8 is a view of a top portion of the drum filter 105 as installed within the housing 125 (the front panel of the housing 125 is shown in FIG. 8). According to various aspects, the drum filter 105 is configured to be sealed to prevent wastewater 102 from inadvertently entering the disc filter 115. The embodiment shown in FIG. 8 includes a seal 164, such as a v-ring seal that seals the drum filter 105 to a portion of the housing 125, and a band clamp 166 to prevent the v-ring seal 164 from moving. A second sealing mechanism, such as a seal and band clamp, may also be positioned on the other side of the drum filter 105 where the central drum 119 penetrates through the sealing plate 126, which can be seen in the photograph of FIG. 9). The sealing plate 126, as discussed above, also prevents the wastewater 102 in the inlet trough 130 from entering and contaminating the filtrate 122 in the outlet trough 135. FIG. 9 is a photograph of the drum filter 105 attached to the central drum 119 of the disc filter 115. The sealing plate 126 is also visible in FIG. 9.

The size of the drum filter 105 may depend on several factors, including the area and opening size of the filter panel 116 of the drum filter 10, and the flow rate of the wastewater for a given head loss.

Figure 12A:
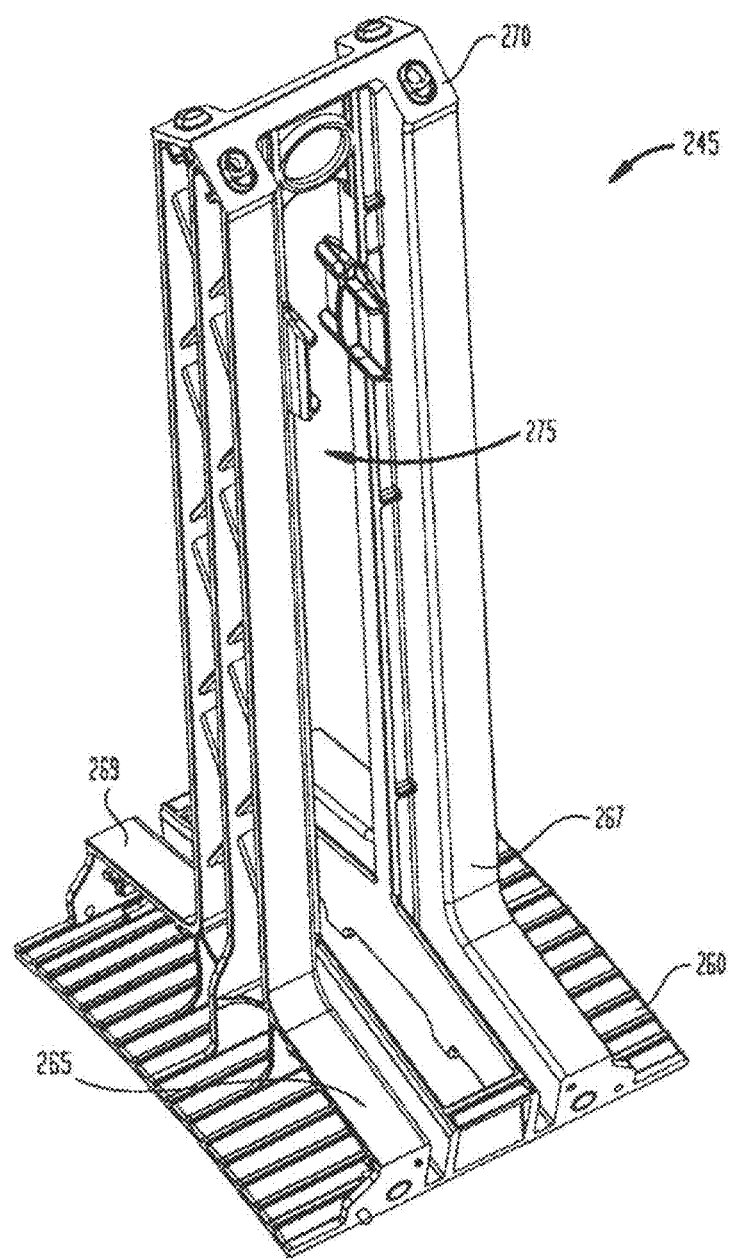
FIG. 12A is a perspective view of a frame support.

Referring now to FIG. 12A, a frame support 245 (also referred to herein as a filter support), for a disc filter 115 in accordance with at least one embodiment is shown. The frame support 245 serves to support a portion of a side 255 and bottom portion 250 of a pair of filter panels 116 (see FIG. 4B). The frame support 245 includes an attachment portion 260 and a transversely oriented strut portion 270. The attachment portion 260 includes a first section 265 which extends from an end 267 of the strut portion 270. The attachment portion 260 also includes a second section 269 which extends from the end 267 in a direction opposite to the first section 265 to thus form an inverted T-shaped frame support 245. The attachment portion 260 further includes a single aperture 275 which extends along the first 265 and second 269 sections of the attachment portion 260 and along the strut portion 270 to thus form a substantially inverted T-shaped aperture which corresponds to the shape of the frame support 245.

Figure 12B:
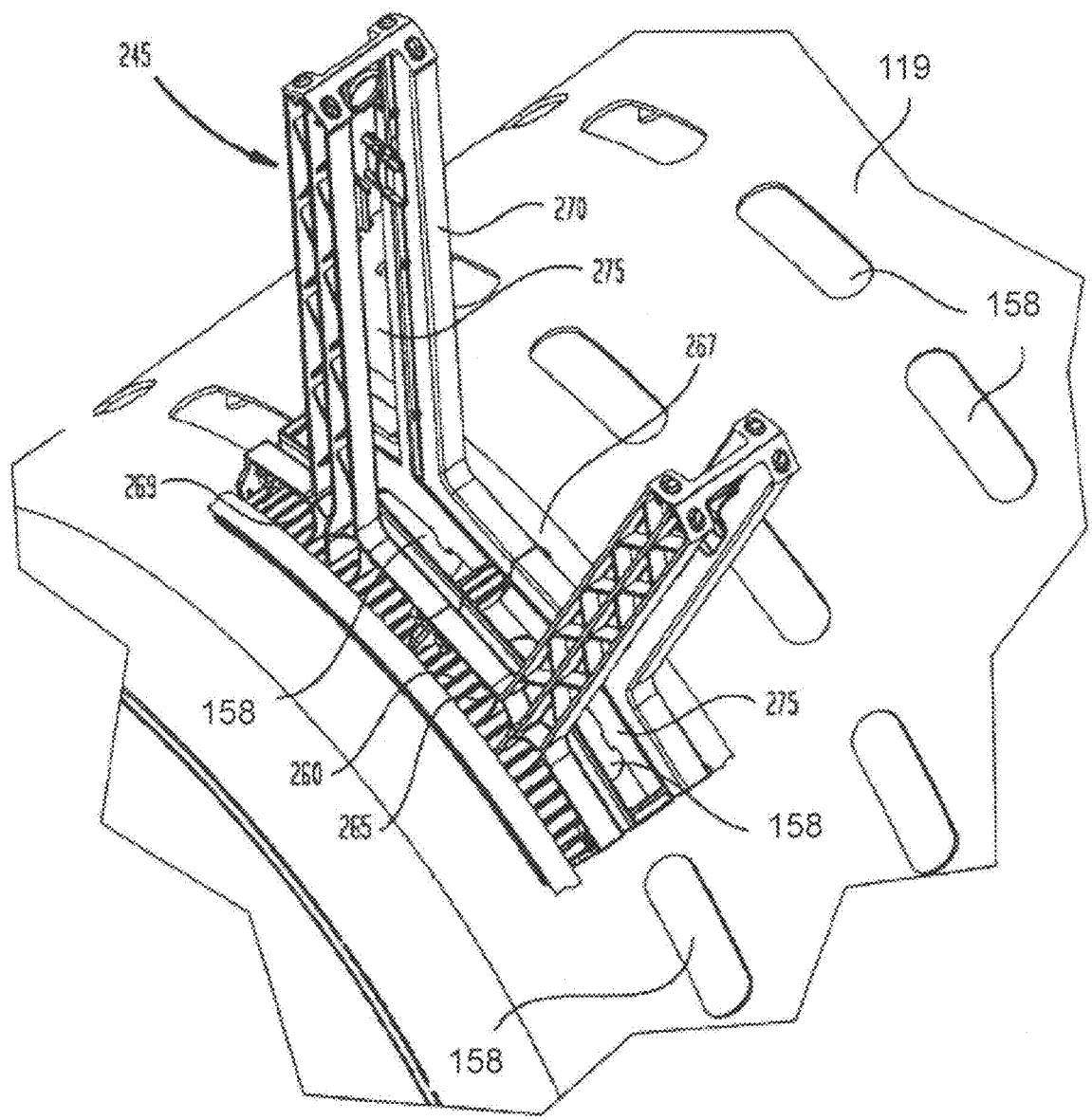
FIG. 12B is a perspective view of the frame support shown in FIG. 12A attached to a central drum.

Referring to FIG. 12B, the frame support 245 is shown positioned on the central drum 119. The attachment portion 260 is designed to be maintained in alignment with drum aperture 158 such that the aperture 275 is in fluid communication or otherwise fluidly connectable with an associated drum aperture 158 in the central drum 119. The aperture 275 is substantially the same size or larger than the drum aperture 158. In another embodiment, the frame support 245 is positioned on the central drum 119 such that the attachment portion 260 straddles a support section of the central drum 119 located in between adjacent drum apertures 158. In this embodiment, portions of two adjacent drum apertures 158 are in fluid communication with the aperture 275.

Figure 12C:
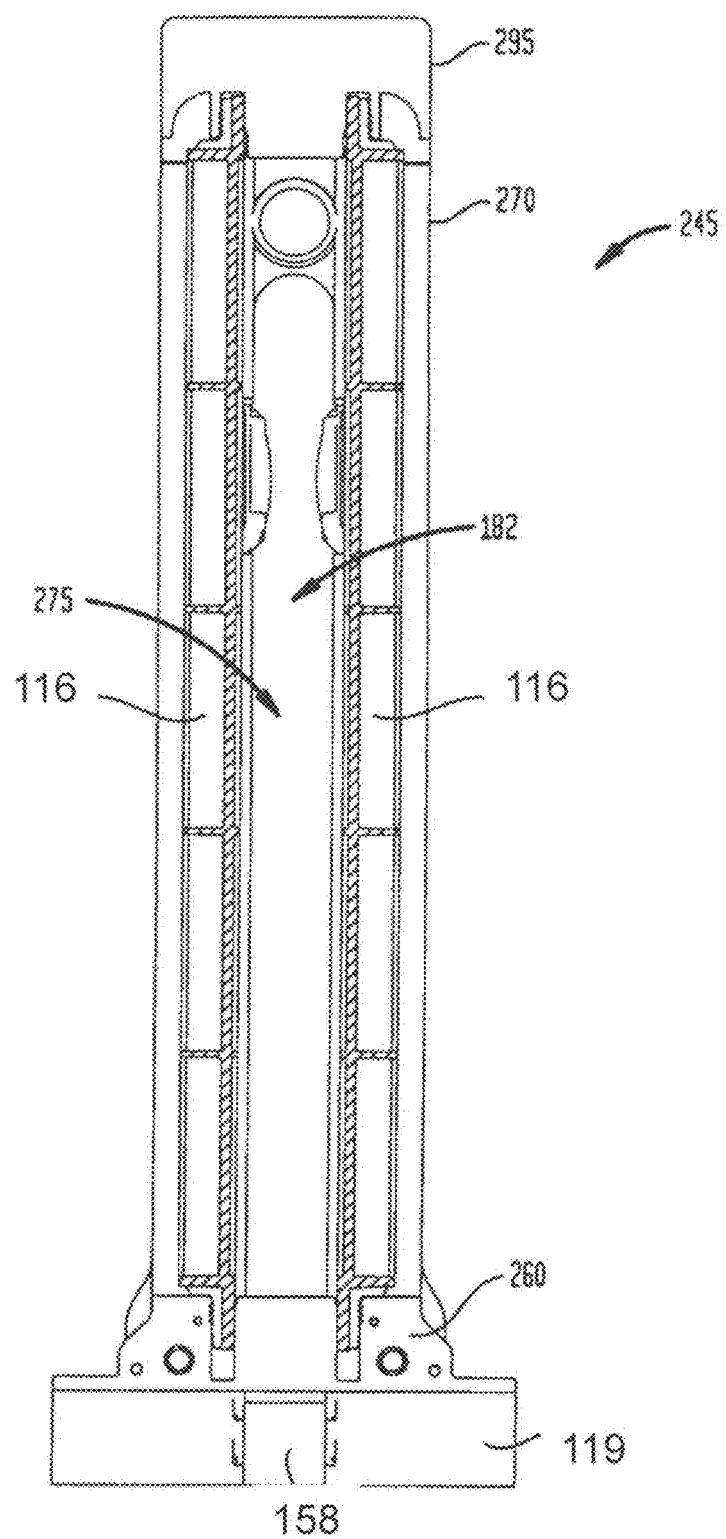
FIG. 12C is an end view of the frame support of FIG. 12A attached to a central drum.
Figure 12D:
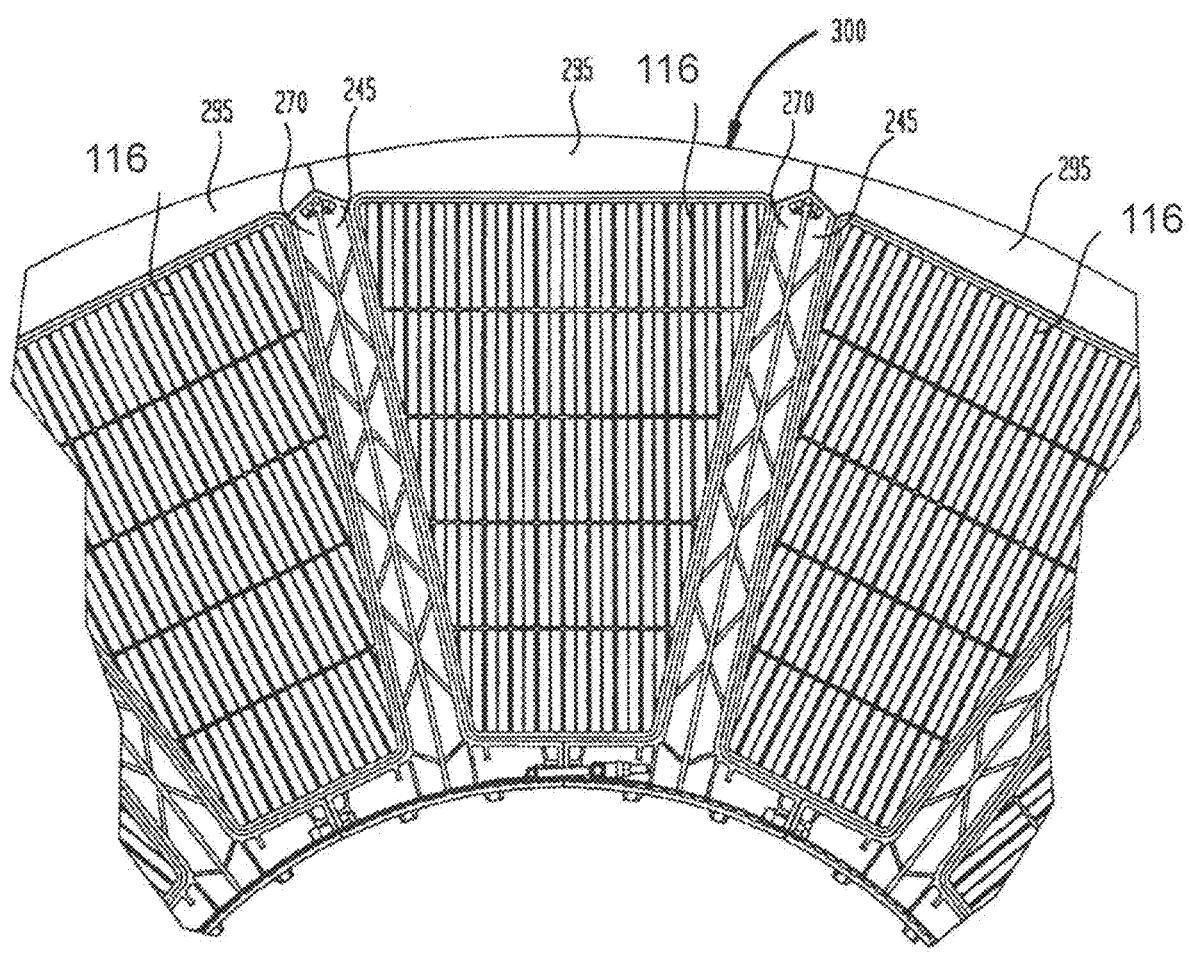
FIG. 12D is a side view of a filter disc including several filter panels and frame supports.
Figure 12E:
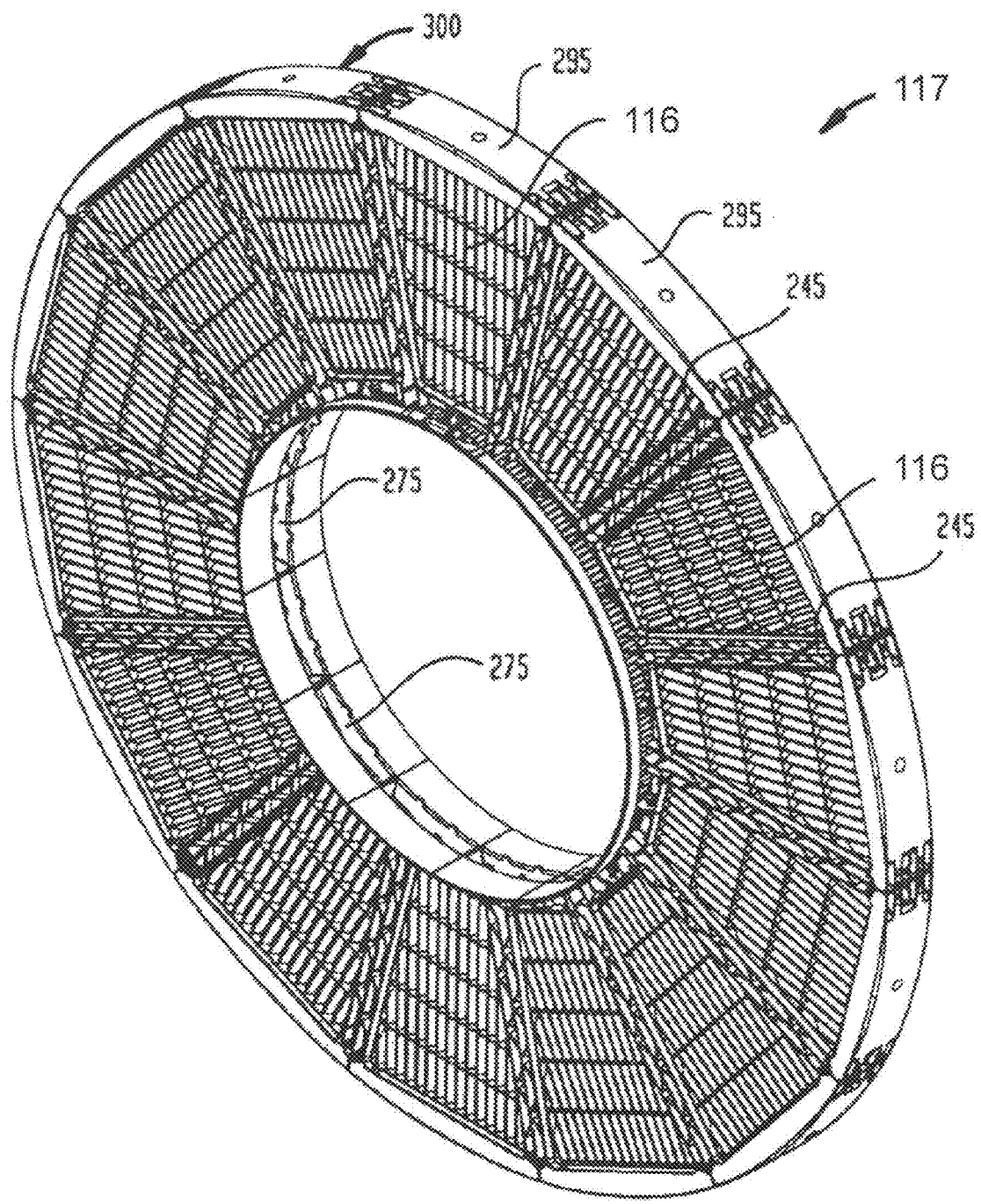
FIG. 12E is a perspective view of a filter disc including a number of filter panels.

Referring to FIG. 12C, a pair of filter panels 116 is shown installed in the frame support 245. The filter panels 116 are spaced apart from each other. Referring to FIG. 12D in conjunction with FIG. 12E, a side view of a plurality of frame supports 245 and filter panels 116 is shown. A cap 295 is used to secure each pair of filter panels 116. Each cap 295 is removably secured to adjacent radial struts 270 to enable removal of each filter panel 116 for cleaning or replacement as necessary. Each filter panel pair, frame support 245 and associated cap 295 form a filter panel set 300 for receiving contaminated water. Further, the filter panels 116, cap 295 and aperture 275 form a volume 182 whose cross sectional area is equal to or larger than the area of drum aperture 158. Volume 182 extends circumferentially around the central drum 119 through each filter panel set 300 on the filter disc 117 and is continuous. Referring to FIGS. 12B, 12C, and 12D in conjunction with FIG. 12E, the aperture 275 enables fluid communication between the drum aperture 158 and adjacent filter panel sets 300. This enables water and air to flow circumferentially between adjacent filter panel sets 300 as the central drum 119 rotates, which may increase the capacity of the disc filter 115.

Figure 13:
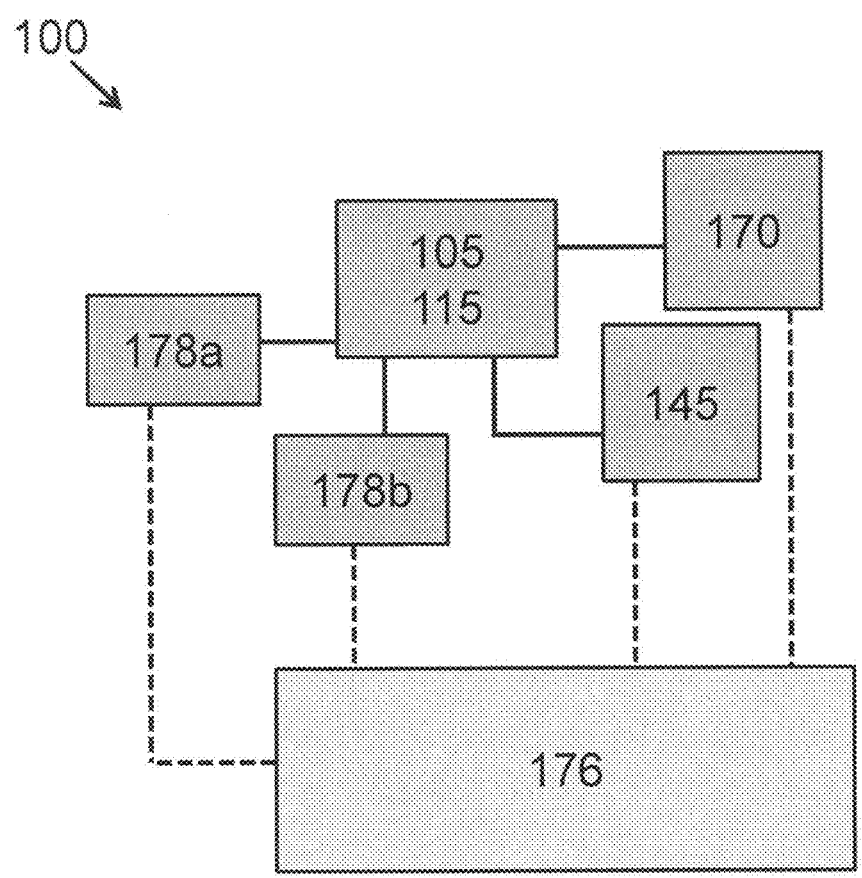
FIG. 13 is a schematic diagram of a two-stage filtration system.

Referring now to FIG. 13, in accordance with one or more embodiments, the two-stage filtration system 100 may further include one or more sensors 178 (e.g., 178a and 178b) and a controller 176, which is operatively coupled to the one or more sensors 178. The sensors may be configured to measure one or more properties of the two-stage filtration system and to send these measurements to the controller 176. The controller 176 may be operatively coupled to one or more components of the system 100, such as the drive assembly 170, the backwash system 145, as well as other components, such as pumps and valves (not shown in FIG. 13). For instance, the controller 176 may also control one or more valves or pumps used in the system to control the route of fluids through the system. The controller 176 is configured to receive measurements taken by the sensors 178 and to control one or more components of the system, such as the drive assembly 170 and the backwash system 145.

According to at least one aspect, the system may include a level sensor, such as level sensor 178a that is positioned in the inlet trough 130 of the housing 125 that houses the drum filter 105 and the disc filter 115. The level sensor 178a may be configured to measure the level of wastewater 102 (influent water) in the inlet trough 130 of the housing 125. An approximate maximum water level (i.e., a predetermined level) for the influent is show in FIG. 7B. Wastewater is fed into the inlet trough 130 at a constant flow rate, which means that the water level in the inlet trough will increase as the solids build up on the filter surfaces of the drum filter 105 (i.e., the filter surface 112 becomes more clogged) and the disc filter 115. The level sensor 178a may take periodic measurements and send these measurements to the controller 176. Therefore, when the water level in the inlet trough 130 exceeds the predetermined water level (e.g., a water level such as that shown in FIG. 7B), the controller 176 may send one or more signals to the system that result in a halt to a filtration process and to start a cleaning process. For instance, the controller 176 may control a motor in the drive assembly 170 to rotate the drum filter 105 and the disc filter 115 at a lower speed and control the sprayers in the backwash system 145 to spray cleaning fluid onto the filter surfaces of each of the drum filter 105 and the disc filter 115 as described above.

The one or more sensors may also include one or more parameter sensors that are configured to measure other process parameters besides the level of influent, which is exemplified at 178b in FIG. 13. For instance, TSS, BOD, chemical oxygen demand (COD), pressure, and/or one or more flow rates may also be monitored by the controller 176 and used to control one or more components of the system based on measurements taken by the one or more parameter sensors.

In accordance with at least one embodiment, a method of treating wastewater is provided that includes introducing the wastewater (e.g., 102) to a first-stage filtration operation comprising a barrier filter (e.g., 105) to produce filtered wastewater (e.g., 104) and then introducing the filtered wastewater to a second-stage filtration operation comprising a disc filter (e.g., 115) to produce treated water (e.g., 122). The method can also further include measuring a level of wastewater introduced to the barrier filter of the first stage filtration operation and backwashing a filter surface of the barrier filter based on the measured level of wastewater. In one embodiment, the barrier filter comprises a rotary drum configured for radially inward fluid flow and the disc filter is configured for radially outward fluid flow.

EXAMPLES

The following examples further illustrate the invention, and are not intended to limit the scope of the disclosure.

Example 1: Two-Stage Tertiary Filtration with 200 Micron Drum Filter

Figure 14:
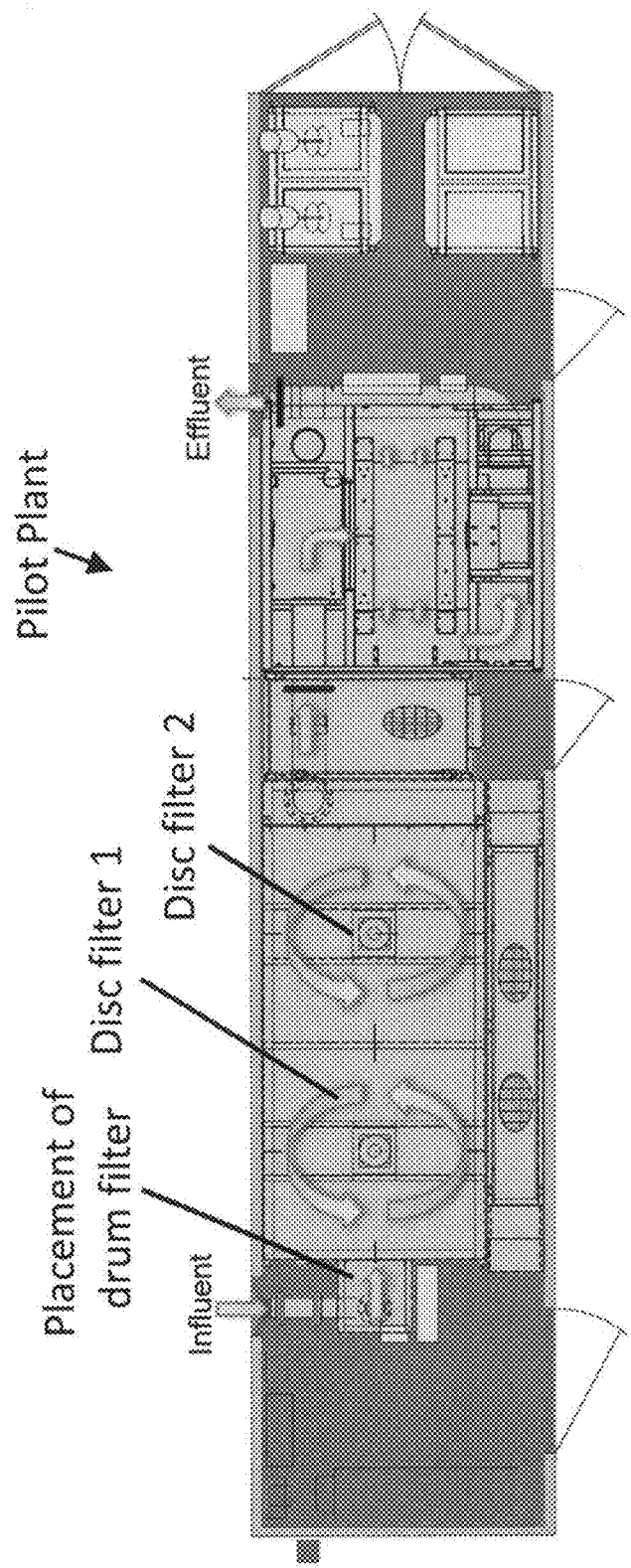
FIG. 14 is a schematic of a pilot plant used in accordance with one or more aspects of the invention.

A pilot plant containing two Forty-X™ filter discs was re-configured to include a drum filter as shown in FIG. 14. The drum filter was added to the influent box (see FIG. 14) that is typically used to measure the influent water level as the disc filter captures solids. This location also allows for the drum filter to seal off to a plate to prevent leaking of influent water to the filtered water. Each disc filter in the pilot plant was 7.2 feet in diameter and included either 10 or 20 micron pleated panel filter media.

Figure 15:
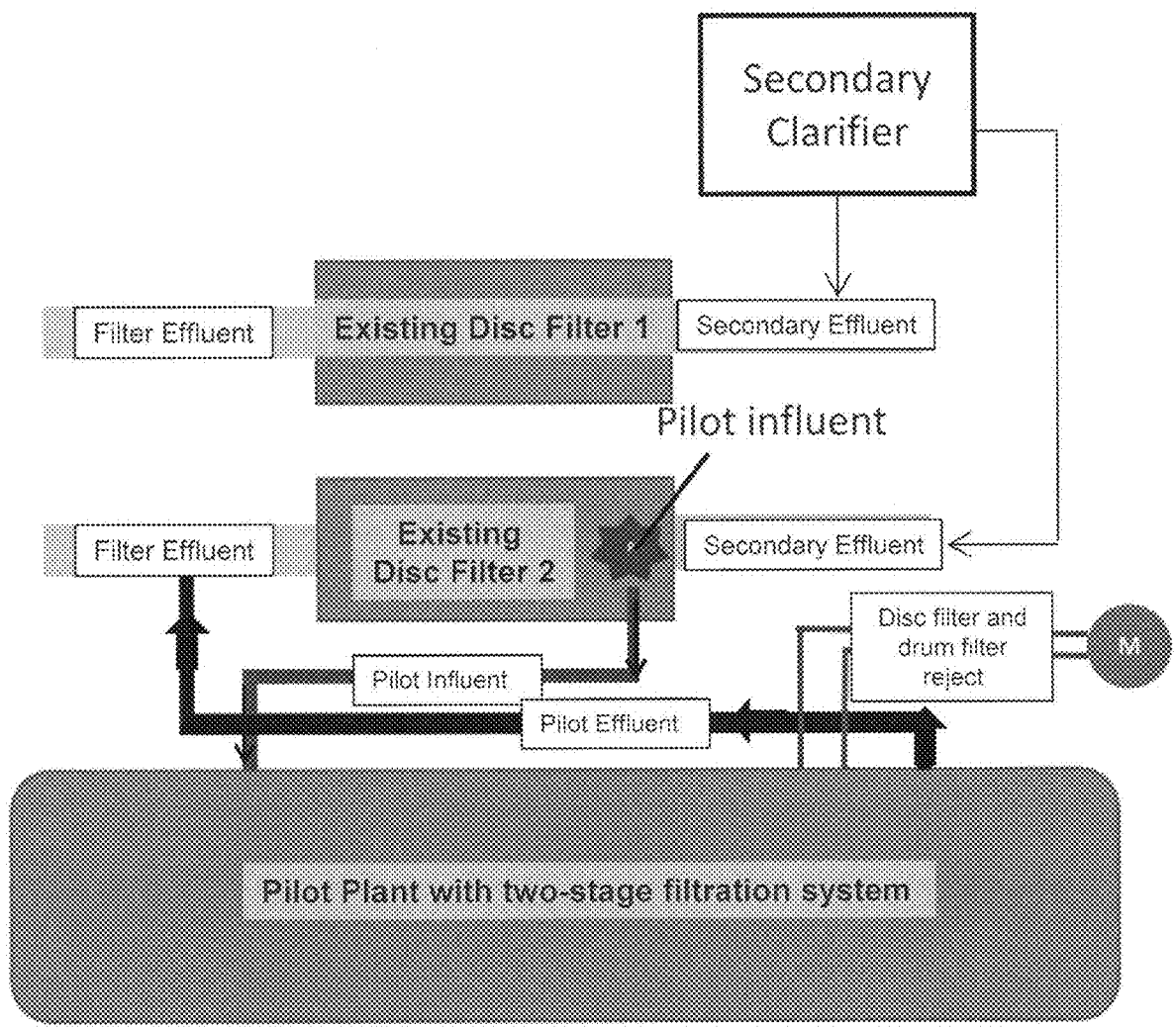
FIG. 15 is a schematic flow diagram of a test site and placement of the pilot plant of FIG. 14.

A schematic of the placement of the pilot plant within an existing wastewater treatment plant (i.e., test site) is shown in FIG. 15. The test site included a secondary treatment process which consisted of an Orbal® biological reactor (Evoqua Water Technologies) followed by Tow-Bro® clarifiers (Evoqua Water Technologies) that provided secondary clarification. The test site also included a tertiary treatment process that consisted of two Hydrotech™ disc filters (available from Veolia) set up in a parallel configuration. The pilot plant was configured to intake influent originally designated for the second existing disc filter such that effluent from the secondary clarifier was provided as influent to the pilot plant, as shown in FIG. 15.

Figure 16:
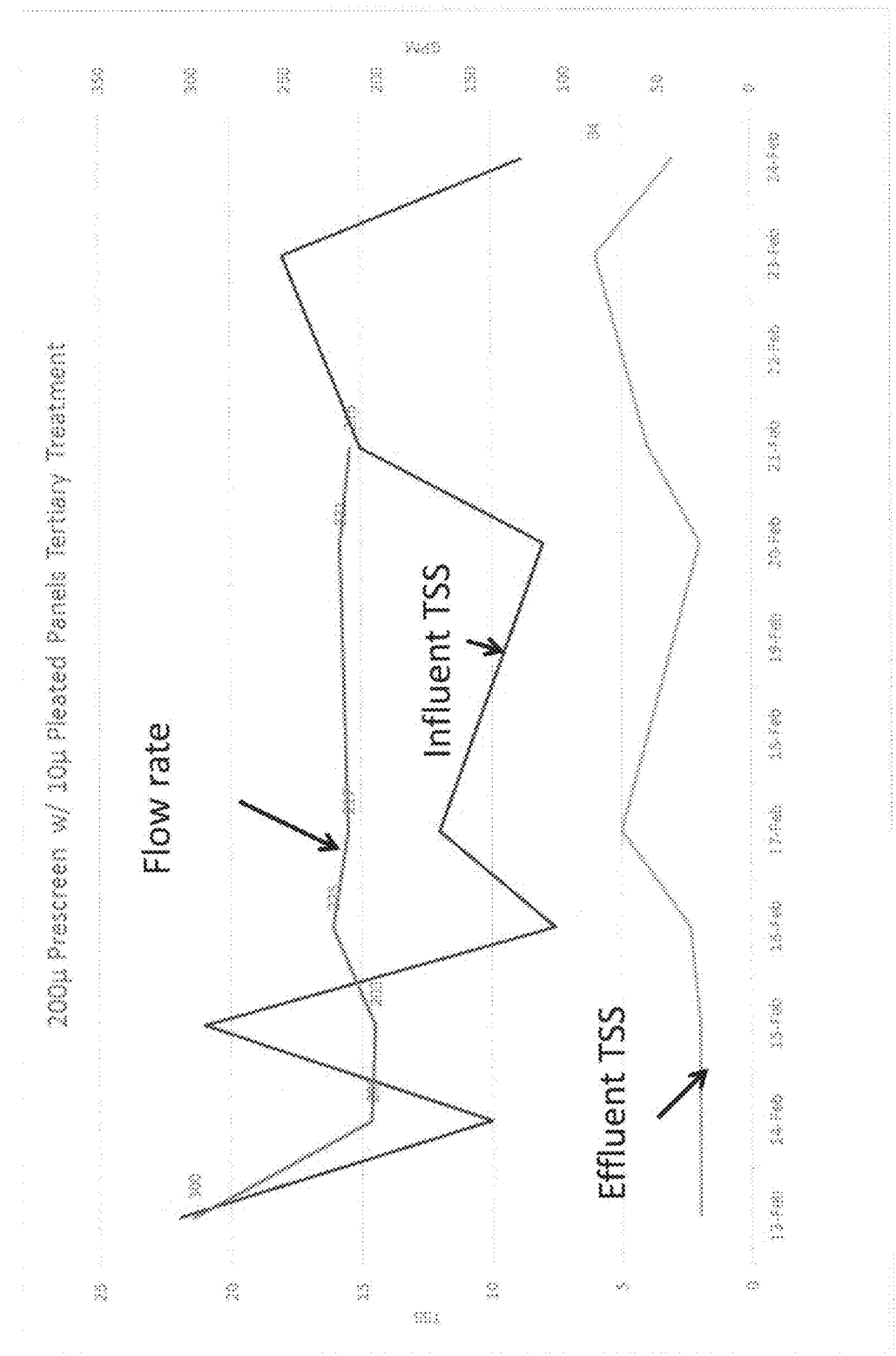
FIG. 16 is a graph showing results of one test performed using a two-stage filtration system in accordance with one or more aspects of the invention.

A 200 micron screen was initially installed on the drum filter. The drum filter was successful in trapping large solids and debris and preventing these items from entering the disc filter, which was fitted with 10 micron filter media. After four months of use, the drum filter showed no signs of wear. TSS data (see left y-axis of FIG. 16) taken over an approximate 11-day period from the influent stream (i.e., wastewater 102, labeled "influent TSS") and the effluent of the disc filter (i.e., 122, labeled as "effluent TSS") is shown in FIG. 16. With an approximate average flow rate of about 210 gpm, the influent TSS values ranged from 7-22 mg/L and effluent TSS values were, on average, below 5 mg/L. TSS and biochemical oxygen demand (BOD) measurements were also taken of both reject streams (i.e., solids captured by the drum filter and solids captured by the disc filter) and are shown below in Table 1. The results from this test indicate that the drum filter is able to relieve some of the TSS load from the disc filter. For example, both filters removed TSS from the wastewater, as indicated in Table 1.

TABLE 1 tertiary reject stream data from 200 micron
drum and 10 micron disc filters

|  | Drum filter reject stream | Disc filter reject stream |
| --- | --- | --- |
| TSS (mg/L) | 220 | 470 |
| BOD (mg/L) | 100 | 130 |

Example 2—Two-Stage Tertiary Filtration with 75 Micron Drum Filter

The 200 micron drum filter experiment discussed above in Example 1 resulted in minimal head loss across the drum filter in both tertiary and primary treatment applications (the primary treatment results are discussed further below). Drum filters having screens with various sizes of openings ranging from 25 microns to 220 microns were tested. The results (not shown) from timed draw-down and turbidity tests indicated that a 75 micron screen yielded the best results.

Figure 17:
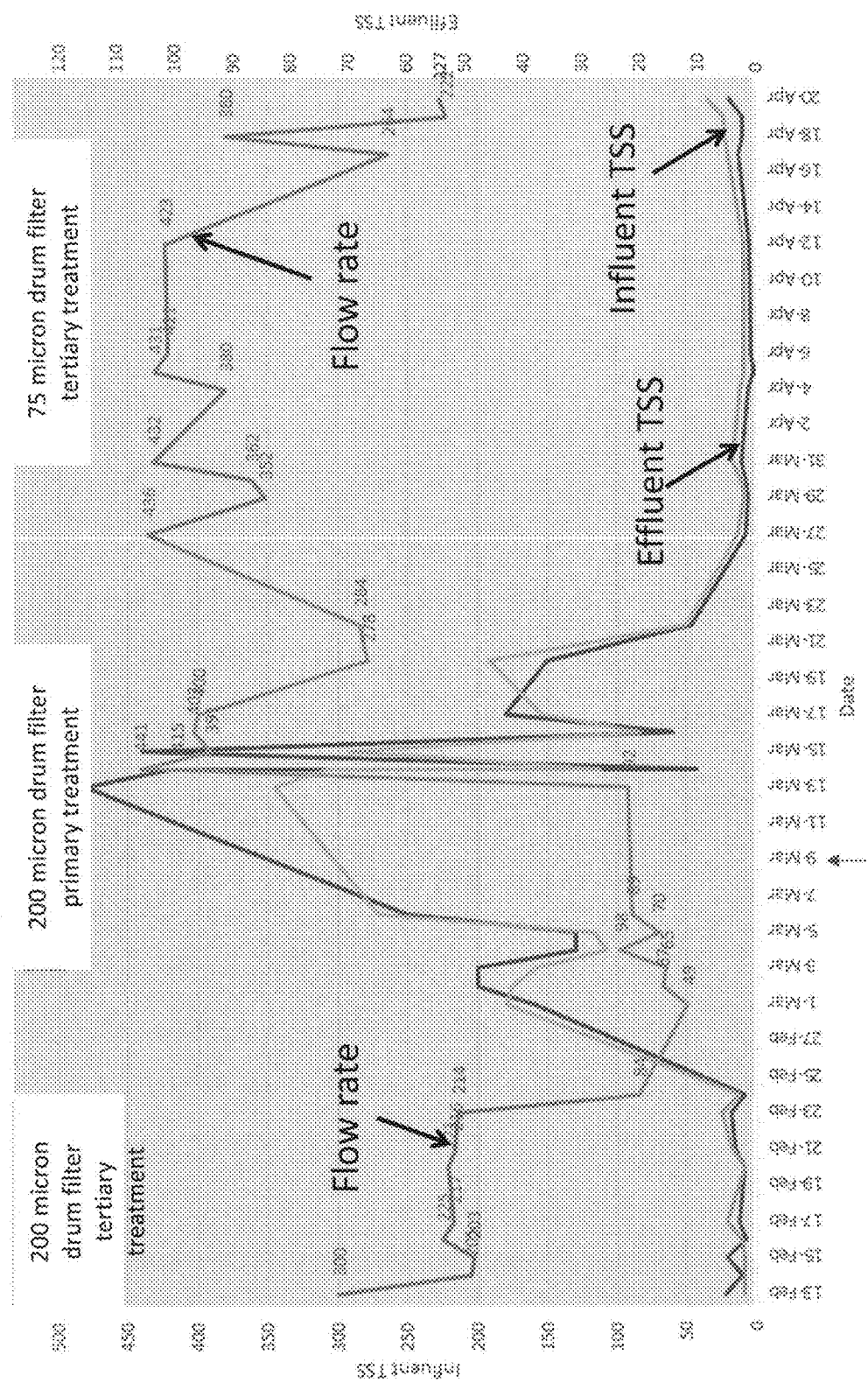
FIG. 17 is a graph showing results of another test performed using a two-stage filtration system in accordance with one or more aspects of the invention.

A 75 micron filter material was then installed on the drum filter and a two-stage tertiary filtration process with a 10 micron pleated panel disc filter was commenced. FIG. 17 includes similar data as shown in FIG. 16 taken over an approximate 24-day period. The flow rate was higher, with values that fluctuated in a range of from about 222 gpm to about 436 gpm, and the influent TSS values were about the same as in Experiment 1. Again, the effluent TSS values were, on average, below 5 mg/L. TSS and BOD measurements were taken of both reject streams and are shown below in Table 2. The results from this test re-confirm that the drum filter relieves at least a portion of the TSS load from the disc filter. The higher flow rate also yielded a higher concentration of solids being trapped by both filters (when compared to the results from Table 1).

TABLE 2 tertiary reject stream data from 75 micron
drum and 10 micron disc filter

|  | Drum filter reject stream | Disc filter reject stream |
| --- | --- | --- |
| TSS (mg/L) | 1000 | 890 |
| BOD (mg/L) | 170 | 220 |

Example 3—Two-Stage Primary Filtration with 200 Micron Drum Filter

For purposes of testing the pilot plant in a primary treatment application, a gas powered trash pump was installed in the raw influent stream that fed the test site. The pump was capable of influent flow rates up to 130 gpm and a secondary pump was used to supplement the flow rate to be as high as 400 gpm.

Figure 18A:
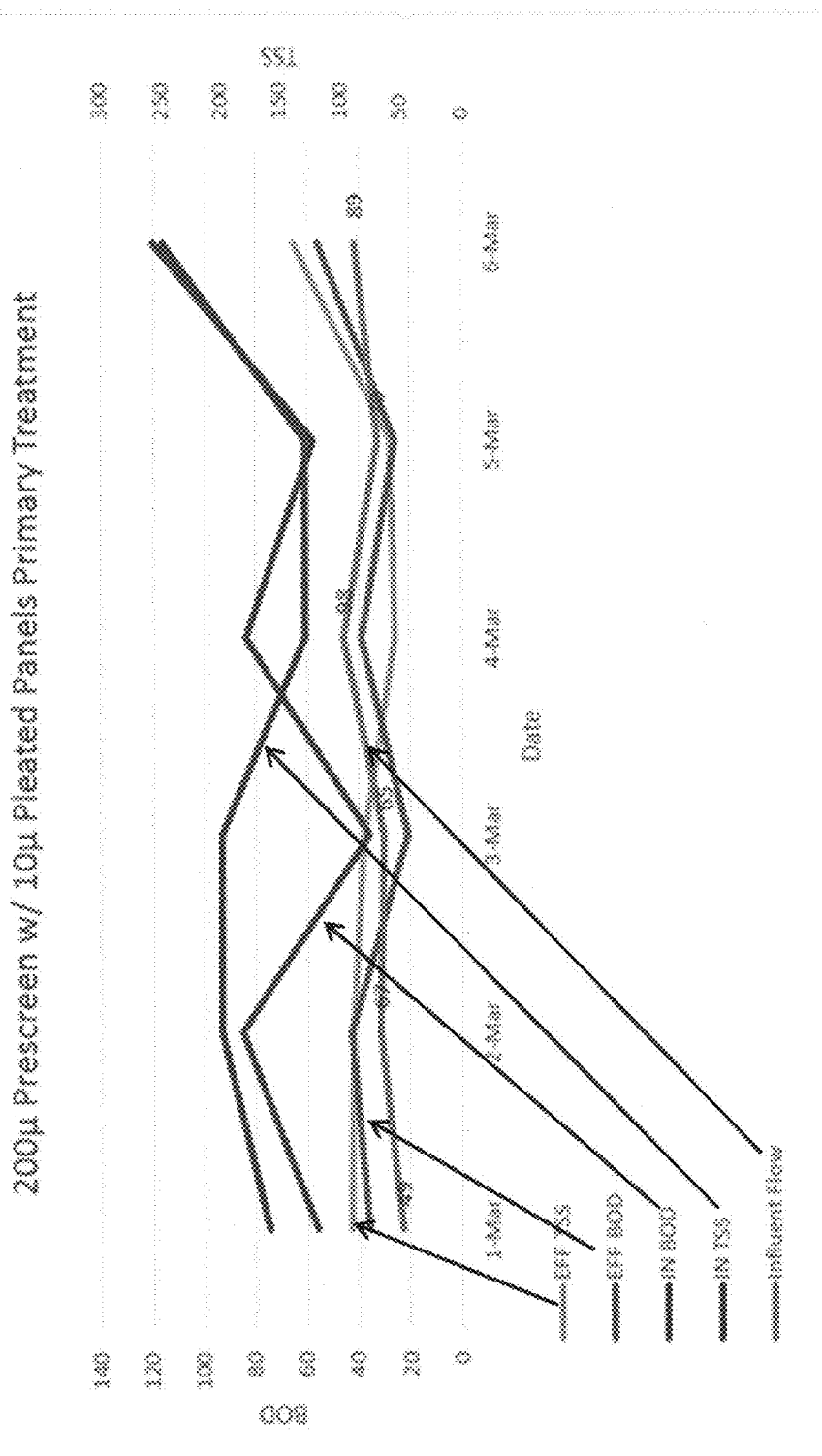
FIG. 18A is a graph showing results of another test performed using a two-stage filtration system in accordance with one or more aspects of the invention.

A 200 micron drum filter was paired with two different sized disc filters. The first disc filter tested was a 10 micron pleated panel disc filter, and two-stage primary filtration was performed using this configuration for approximately 6 days. FIG. 18A is a graph showing the TSS (right y-axis) and BOD (left y-axis) measurement results taken of the influent and effluent streams, as well as the flow rate, which ranged from 49 to 98 gpm. The second disc filter that was tested was fitted with a 25 micron flat stainless steel panel was also tested over an approximate 9-day period. The TSS and BOD measurement results from the influent and effluent streams are shown in the graph of FIG. 18B, as well the flow rate, which ranged from 92 to 415 gpm.

Figure 18B:
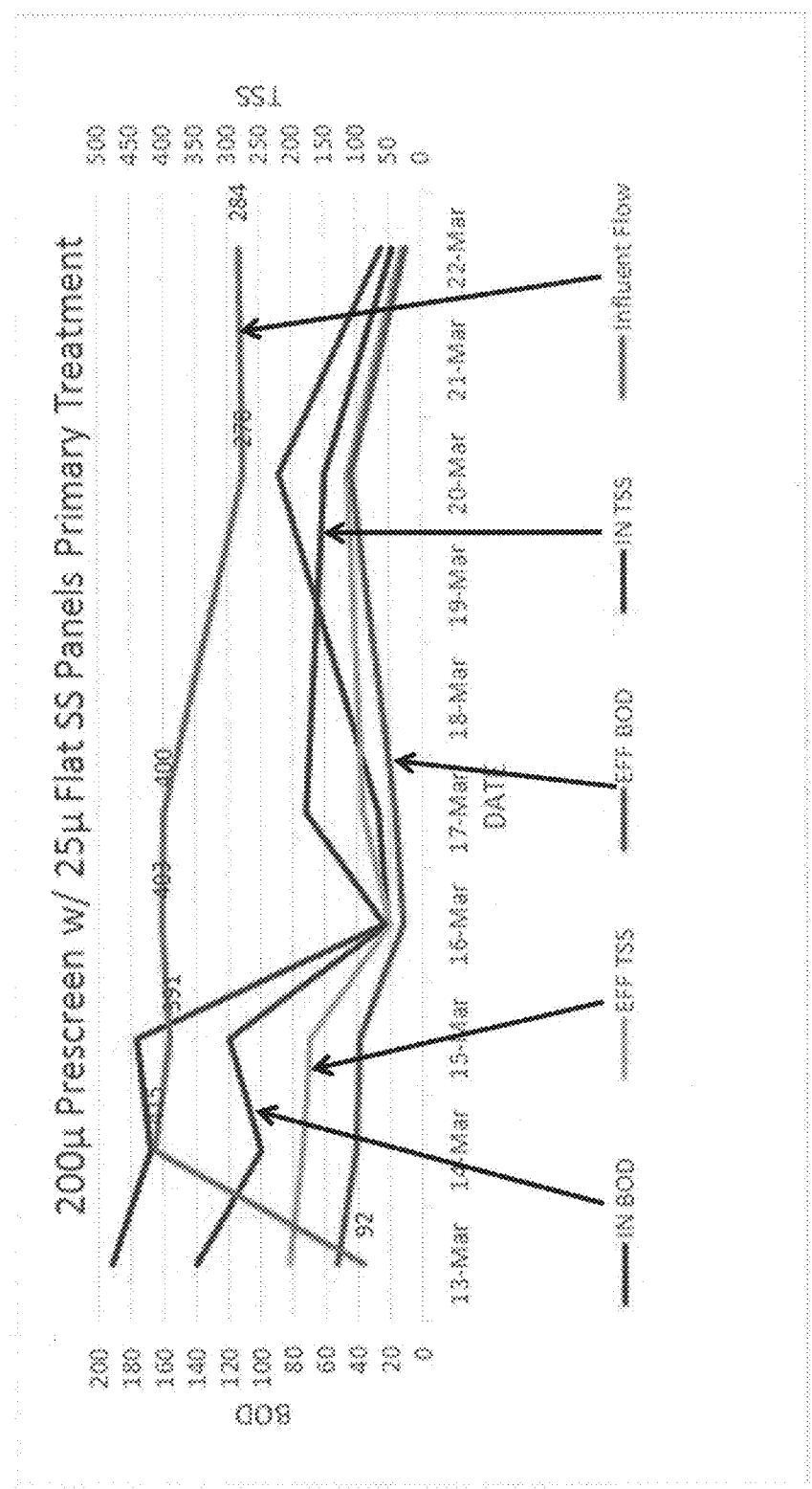
FIG. 18B is a graph showing results of another test performed using a two-stage filtration system in accordance with one or more aspects of the invention.

The results shown in FIGS. 18A and 18B indicate an average removal of 55% of the influent BOD and 85% of the influent TSS levels. The effluent TSS and BOD values are similar to those achieved without a drum filter functioning as a first stage filtration process, but the two-stage filtration process allows for the disc filter to run more continuously without immediately clogging and having to be taken offline and cleaned. The drum filter as a pre-filter or first stage filtration process also increases the capacity of the system when the influent TSS values are very high.

Combined influent and effluent TSS data from all three examples are also shown in FIG. 17.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A filter device for filtering a fluid, the filter device comprising:
   a rotatable central drum including a plurality of openings along its length;
   a plurality of disc-shaped filter members attached to the rotatable central drum, defining a plurality of enclosed spaces in fluid communication with an interior of the rotatable central drum through the plurality of openings;

a rotary drum filter defining an inner chamber in fluid communication with the interior of the rotatable central drum; and a housing at least partially surrounding the rotary drum filter and the plurality of disc-shaped filter members, wherein a fluid to be filtered passes through a filtration surface of the rotary drum filter into the inner chamber producing a filtrate which passes into the interior of the rotatable central drum through the plurality of openings, into the plurality of enclosed spaces, and through a filtration surface of the plurality of disc-shaped filter members further filtering the fluid.

2. The filter device of claim 1, wherein the rotary drum filter and the rotatable central drum are positioned along a common longitudinal axis.

3. The filter device of claim 1, wherein the housing includes an inlet trough for receiving fluid to be filtered, said rotary drum filter being positioned in a space defined by said inlet trough.

4. The filter device of claim 3, wherein the housing includes an outlet trough for collection of fluid that has passed through said plurality of disc-shaped filter members and a sealing plate sealingly separating the inlet trough from the outlet trough.

5. The filter device of claim 1, further comprising a backwashing system comprising a first plurality of spray nozzles for spraying a backwash fluid onto the plurality of disc-shaped filter members to dislodge collected debris.

6. The filter device of claim 5, wherein the backwashing system further comprises a disc filter backwash trough for collection of spent backwash fluid and dislodged debris from the plurality of disc-shaped filter members.

7. The filter device of claim 1, further comprising a backwashing system including a second plurality of spray nozzles for spraying backwash fluid onto the filtration surface of the rotary drum filter to dislodge collected debris.

8. The filter device of claim 7, wherein the backwashing system further comprises a rotary drum filter collection trough for collection of dislodged debris from said rotary drum filter.

9. The filter device of claim 1, wherein the filtration surface of the rotary drum filter has openings with a diameter in a range of about 20 microns to about 800 microns.

10. The filter device of claim 1, wherein the filtration surface of the rotary drum filter comprises one of wedge wire screen material or woven filter media material.

11. The filter device of claim 1, wherein the plurality of disc-shaped filter members include a filter media with openings having a diameter in a range of about 6 microns to about 300 microns.

12. The filter device of claim 1, wherein the fluid to be filtered comprises wastewater from a secondary or primary treatment process.

* * * * *